(12) United States Patent
Sisson et al.

(10) Patent No.: US 10,775,817 B2
(45) Date of Patent: Sep. 15, 2020

(54) REFERENCE VOLTAGE CONTROL IN A POWER SUPPLY

(71) Applicant: Infineon Technologies Austria AG, Villach (AT)

(72) Inventors: Paul Sisson, Exeter, RI (US); Keng Chen, Sudbury, MA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/909,323

(22) Filed: Mar. 1, 2018

(65) Prior Publication Data

US 2019/0271998 A1 Sep. 5, 2019

(51) Int. Cl.
| | |
|---|---|
| G05F 1/46 | (2006.01) |
| G05F 1/575 | (2006.01) |
| H02M 3/156 | (2006.01) |
| H02M 3/335 | (2006.01) |
| H04N 3/185 | (2006.01) |
| H02M 1/36 | (2007.01) |
| H02M 3/158 | (2006.01) |
| H02M 1/15 | (2006.01) |
| H02M 1/14 | (2006.01) |
| H02M 1/00 | (2006.01) |

(52) U.S. Cl.
CPC .............. *G05F 1/468* (2013.01); *G05F 1/575* (2013.01); *H02M 1/14* (2013.01); *H02M 1/15* (2013.01); *H02M 1/36* (2013.01); *H02M 3/156* (2013.01); *H02M 3/158* (2013.01); *H02M 3/1584* (2013.01); *H02M 3/33507* (2013.01); *H04N 3/185* (2013.01); *H02M 2001/0025* (2013.01); *H02M 2001/0032* (2013.01); *H02M 2003/1586* (2013.01)

(58) Field of Classification Search
CPC ...... H02M 3/158; H02M 3/156; H02M 3/155; H02M 3/157; H02M 3/1563
USPC .......................................... 323/271, 282–285
See application file for complete search history.

(56) References Cited

U.S. PATENT DOCUMENTS

| | | | |
|---|---|---|---|
| 4,160,981 A | 7/1979 | Raney, Jr. | |
| 5,600,234 A | * 2/1997 | Hastings | ................. G05F 1/575 323/282 |

(Continued)

OTHER PUBLICATIONS

Kuang-Yao Cheng, et al., "Characterization and Performance Comparison of Digital V2-Type Constant on-Time Control for Buck Converters", Jun. 1, 2010, pp. 1-6, Control an Modeling for Power Electronics (Compel), 2010 IEEE 12th Workshop on.

(Continued)

*Primary Examiner* — Nguyen Tran
(74) *Attorney, Agent, or Firm* — Armis IP Law, LLC

(57) ABSTRACT

A power supply includes a power converter, a reference voltage generator, and a controller. During operation, the power converter produces an output voltage to power a load. The reference voltage generator (such as a voltage mode amplifier circuit) generates a floor reference voltage, a magnitude of which varies as a function of the output voltage error. The controller compares an output voltage feedback signal (derived from the output voltage) to the floor reference voltage to produce control output to control timing of activating switches in the power converter to maintain the output voltage within a desired voltage range.

26 Claims, 14 Drawing Sheets

(56) References Cited

U.S. PATENT DOCUMENTS

| | | | |
|---|---|---|---|
| 6,066,943 A * | 5/2000 | Hastings | H02M 3/156 323/285 |
| 6,930,526 B1 * | 8/2005 | Silva | H02M 3/156 323/274 |
| 7,782,024 B2 * | 8/2010 | Fukushi | H02M 1/088 323/222 |
| 8,018,210 B2 | 9/2011 | Chen et al. | |
| RE43,414 E | 5/2012 | Walters | |
| 8,183,848 B2 | 5/2012 | Kuo | |
| 8,217,636 B2 * | 7/2012 | Khayat | H02M 3/157 323/282 |
| 8,896,284 B2 | 11/2014 | Fan | |
| 9,270,176 B1 | 2/2016 | Nguyen et al. | |
| 9,293,993 B1 | 3/2016 | Shehu | |
| 9,541,974 B1 | 1/2017 | Presti et al. | |
| 9,606,564 B2 | 3/2017 | Agrawal | |
| 2006/0055385 A1 * | 3/2006 | Schiff | H02M 3/1563 323/282 |
| 2008/0049478 A1 | 2/2008 | Wong | |
| 2008/0298090 A1 | 12/2008 | Li et al. | |
| 2009/0001949 A1 | 1/2009 | Komori | |
| 2009/0206808 A1 | 8/2009 | Wrathall | |
| 2009/0243580 A1 | 10/2009 | Chen | |
| 2011/0057635 A1 * | 3/2011 | Ishikawa | H02M 1/36 323/282 |
| 2011/0316508 A1 | 12/2011 | Cheng et al. | |
| 2012/0313603 A1 * | 12/2012 | Ochoa | G06K 19/0709 323/282 |
| 2012/0326688 A1 | 12/2012 | Sun et al. | |
| 2013/0038301 A1 | 2/2013 | Ouyang et al. | |
| 2013/0038302 A1 | 2/2013 | Qian et al. | |
| 2013/0128627 A1 | 5/2013 | Moon | |
| 2013/0141069 A1 | 6/2013 | Li | |
| 2013/0187624 A1 * | 7/2013 | Wakasugi | H02M 3/158 323/282 |
| 2014/0091774 A1 | 4/2014 | Srinivasan et al. | |
| 2014/0132236 A1 | 5/2014 | Darmawaskita et al. | |
| 2014/0176091 A1 | 6/2014 | Chiang et al. | |
| 2014/0327423 A1 | 11/2014 | Lee et al. | |
| 2014/0361687 A1 | 12/2014 | Olson | |
| 2015/0311798 A1 | 10/2015 | Yuan et al. | |
| 2016/0006352 A1 | 1/2016 | Hang et al. | |
| 2016/0067963 A1 | 3/2016 | Van Brocklin et al. | |
| 2017/0155315 A1 | 6/2017 | Yasusaka | |

OTHER PUBLICATIONS

Tian Shulin, et al., "Small-signal Mode Analysis and Design of Constant-on-time V2 Control for Low-ESR Caps with External Ramp Compensation" Sep. 17, 2011, pp. 2944-2951, Energy Conversion Congress and Exposition (ECCE), IEEE.

Tian Shuilin, et al., "A Three-Terminal Switch Model of Constant On-Time Current Mode with External Ramp Compensation", Oct. 1, 2016, pp. 7311-7319, IEEE Transactions on Power Electronics, vol. 31, No. 10.

Extended European Search Report, EP 18176183.4, Oct. 10, 2018, pp. 12.

European Search Report, EP 19158445.7, Jul. 2, 2019, pp. 10.

Tapashetti, et al. "Design and Simulation of Op Amp Integrator and Its Applications", International Journal of Engineering and Advanced Technology (I.J EAT) Feb. 20, 2012, ISSN: 2249 - 8958, Volurne-1, Issue-3.

Office action, EP 19 158 445.7, dated Mar. 24, 2020, pp. 8.

* cited by examiner

REFERENCE VOLTAGE CONTROL IN A POWER SUPPLY

RELATED APPLICATION

This application is related to U.S. patent application Ser. No. 15/909,382 entitled "REFERENCE VOLTAGE CONTROL IN A POWER SUPPLY," filed on Mar. 1, 2018, the entire teachings of which are incorporated herein by this reference.

BACKGROUND

Conventional power supplies may include one or more DC to DC converters to produce a respective output voltage to power a load. One type of DC-to-DC converter is a single-stage power converter system. As its name suggests, in the single-stage power converter system, each phase includes a single power converter to convert an input voltage such as 12 V DC (Volts Direct Current) into a respective target output voltage such as 1 volt DC to power a load.

One type of power converter is a buck converter. A so-called Constant ON Time (COT) switching buck regulator has fixed ON-time and uses off-time Pulse Width Modulation (PWM) to regulate an output voltage. In general, to maintain an output voltage within a desired range, the buck converter compares the magnitude of a generated output voltage to control respective switch circuitry (such as a control switch and synchronous switch).

BRIEF DESCRIPTION

Power supply architectures such as ramp-based architectures with an active error controlled (floor) reference voltage can improve the accuracy of the regulated output voltage. This is described in related U.S. patent application Ser. No. 15/614,799 entitled "POWER SUPPLY CONTROL AND USE OF GENERATED RAMP SIGNAL," filed on Jun. 6, 2017, the entire teachings of which are incorporated herein by this reference.

In order to achieve high DC (Direct Current) Voltage accuracy and a stable operating point, a voltage mode amplifier with high gain and very low bandwidth (such as a floor amplifier) can be used to set the regulation point of the power converter. The obtained reference voltage, also referred to as a floor reference or floor voltage herein, is then used to regulate the output voltage of the power supply, for instance directly as one of a plurality of values which are used to regulate the output voltage such as by comparison between them, or indirectly for instance through serving as an offset for a ramp voltage. In a given configuration, a small signal ramp can be added to this reference voltage Vfloor, to form an offset ramp reference. An output voltage feedback signal is then compared to the offset ramp reference to regulate the output voltage within a desired voltage range. In general, the addition of the ramp reference enhances signal to noise ratio and reduces jitter in the control loop output.

However, there may be performance issues associated with using such a floor voltage. For example, during startup, the slow response of a respective amplifier generating the floor voltage can result in undesired lag of the regulator output voltage. This is particularly undesirable in systems where there is a pre-existing voltage (pre-bias) at start up. When the output voltage ramps to the regulation voltage, such as during a phase called Soft Start (SS), the constant ON time (COT) converter is expected to be predictable and linear such that the regulation is achieved in a programmed time, independent of pre-bias. If the amplifier that generates the floor voltage, Vfloor, is used in the control loop during start-up, and if there is a pre-bias, then the amplifier skews to its rail or clamps voltage until the SS reference approaches the pre-bias voltage. When the soft start (SS) signal reference reaches the pre-bias voltage, this amplifier is substantially out of position and the converter must then attempt to catch up to the SS reference. This can lead to a non-linear and protracted startup that in some cases results in high converter currents. The larger the pre-biased voltage is at the output, the longer the time to start-up. Certain embodiments herein solve this problem.

This disclosure includes the observation that, in a continuous conduction mode, a power converter can draw both positive current (such as from an input voltage source) and negative current (such as current from ground). This leads to a very predictable output ripple voltage above and below the target converter regulation voltage for which the floor generating amplifier control loop provides excellent performance and control. However, in Discontinuous Conduction Mode (DCM), negative current draw from a respective current supplying inductor in a power supply phase is unacceptable, so the down slope of the ripple becomes solely dependent on converter load. This can lead to a very unpredictable ripple in which the output voltage can be above the regulation voltage for relatively long intervals in time. In this mode, the floor-generating amplifier will skew, as described in the first problem as discussed above, leaving the floor-generating amplifier at an improper magnitude when the output voltage crosses through the target reference voltage. Output voltage undershoot/overshoot with large transient converter currents can occur if operated in this mode. As further described herein, certain embodiments herein address the problem of operating the in the discontinuous conduction mode.

In contrast to conventional approaches, embodiments herein include novel ways of providing more accurate voltage regulation in a switching power supply over a variety of operating conditions.

More specifically, embodiments herein include a floor reference voltage generator, a mode controller, and phase control circuitry. The floor reference voltage generator is configured to produce a floor reference voltage during operation. Typically, the floor reference voltage generator takes the form of a circuitry designed to that end.

The phase control circuitry produces an output voltage to power a load as a function of an output voltage feedback signal derived from the output voltage of the switching power supply and of the floor reference voltage.

In accordance with one embodiment, the mode controller is configured to switch between operating in a first operational mode and a second operational mode. In the first operational mode, the floor reference voltage is set to a predetermined fixed voltage value. This voltage value is of constant magnitude. In the second operational mode, the magnitude of the floor reference voltage varies. Switching between the first operational mode and the second operational mode provides better output voltage regulation over the different operational modes.

Typically, the mode controller may take the form of a circuitry designed to carry out the above functions.

In accordance with further embodiments, in contrast to the first operational mode of producing the floor voltage at a predetermined fixed voltage, while in the second operational mode, the floor reference voltage generator is operable to adjust a magnitude of the floor reference voltage during transient conditions in which the load powered by the output voltage varies a rate of consuming current provided by the output voltage. A magnitude of the floor reference voltage varies based at least in part on a magnitude of the output voltage.

Further embodiments herein include a ramp generator configured to produce and output a ramp voltage signal. Typically, the ramp generator takes the form of circuitry. In certain embodiments, the ramp voltage signal is offset relative to another signal of the power supply, whereby the output of the ramp generator forms an offset ramp voltage signal.

In one embodiment, the ramp voltage signal is offset relative to the floor reference voltage. In such a configuration, for instance, the ramp voltage signal is added to the floor reference.

In one embodiment, the ramp voltage signal is offset relative to the output voltage feedback signal. In such a configuration, for instance, the ramp voltage signal is subtracted from the output voltage feedback signal.

Further embodiments herein include a comparator or other circuit operable to to detect a condition in which a difference between a magnitude of the output voltage feedback signal and a magnitude of the floor reference voltage is substantially equal to a magnitude of the ramp voltage signal. The condition is used as a basis to activate switch circuitry in the power supply.

In accordance with further embodiments, the power supply as discussed herein includes a tracking circuit (such as buffer, sample and hold circuit, unity gain amplifier, etc.) operable to track the floor reference voltage during the second operational mode during which the floor reference voltage varies. The voltage value stored in the tracking circuit can be used as control input to the floor reference voltage generator to switch over to setting the floor reference voltage to the predetermined value during the first operational mode.

In still further embodiments, the controller can be configured to switch between the different voltage floor modes (fixed or variable) based on any suitable monitored attribute or power supply parameter. In one embodiment, the controller is operable to switch from the first operational mode to the second operational mode in response to detecting that the output voltage resides within a target voltage range such as for a predetermined amount of time.

Further embodiments herein include a monitor circuit (such as part of the mode controller) operable to monitor the output voltage and switch between the first operational mode and the second operational mode based on attributes or conditions (such as health) associated with the power supply during generation of the output voltage. The monitored attributes or conditions can include any suitable parameter such as a magnitude of the output voltage, a magnitude of current supplied to the load via the output voltage, whether the power supply is in start up mode, etc.

In accordance with further embodiments, the phase control circuitry can be configured to include a comparator circuit operable to, while in the first operational mode, switch between comparison of: i) the output voltage feedback signal and a soft start signal, and ii) the output voltage feedback signal and an offset ramp voltage signal. In one embodiment, the comparator circuit uses the soft start signal for comparison to the output voltage feedback signal depending on a magnitude of the soft start signal.

In accordance with further embodiments, the phase control circuitry can be configured to include a comparator circuit operable to, while in the first operational mode, switch between comparison of: i) the output voltage feedback signal and a soft start signal, and ii) the output voltage feedback signal and the floor reference voltage.

Yet further embodiments herein include operating the power supply (such as a DC-DC converter) in a constant ON time control mode in which the phase control circuitry activates respective control switch circuitry at a varying frequency rate to produce the output voltage. In such a mode, the power converter generates fixed pulse width switch control signals to produce the output voltage based on a comparison of the output voltage feedback signal to: i) the floor reference voltage or ii) offset ramp voltage signal, depending on the embodiment.

In these, and alternative embodiments, the phase control circuitry is operable to reset a magnitude of the ramp voltage signal in response to detecting a condition in which a difference between a magnitude of the output voltage feedback signal and a magnitude of the floor reference voltage is substantially equal to a magnitude of the ramp voltage signal.

Embodiments herein are useful over conventional techniques. For example, switching between a static floor reference and variable floor reference to produce an offset reference as discussed herein provides better regulation of a generated output voltage during different operating conditions.

These and other more specific embodiments are disclosed in more detail below.

Note that techniques as discussed herein can be implemented in any suitable environment such as multi-phase power supply applications, single phase point of load (a.k.a., POL) power supply applications, etc.

Note further that although embodiments as discussed herein are applicable to multi-phase power supply circuits such as those implementing buck converters, DC-DC converter phases, the concepts disclosed herein may be advantageously applied to any other suitable topologies as well as general power supply control applications.

Additionally, note that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program instructions and/or logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), circuit logic, etc. The software or firmware or other such configurations can be installed onto a respective controller circuit to cause the controller circuit (such as logic) to perform the techniques explained herein.

Accordingly, one embodiment of the present disclosure is directed to a computer program product that includes a computer readable medium having instructions stored thereon for supporting operations such as controlling one or more phases in a power supply. For example, in one embodiment, the instructions, when carried out by computer processor hardware (one or more computer devices, control logic, digital circuitry, etc.), cause the computer processor hardware to: produce a floor reference voltage; produce an output voltage of a power supply to power a load as a function of an output voltage feedback signal of the power supply and of the floor reference voltage; and during generation of the output voltage, switch the power supply between a first operational mode in which the floor reference voltage is set to a predetermined fixed voltage value and a second operational mode in which a magnitude of the floor reference voltage value varies.

Another embodiment of the present disclosure is directed to a computer program product that includes a computer readable medium having instructions stored thereon for supporting operations such as controlling one or more phases in a power supply. For example, in one embodiment, the instructions, when carried out by computer processor hardware (one or more computer devices, control logic, digital circuitry, etc.), cause the computer processor hardware to: produce an output voltage to power a load; generate a floor reference voltage, a magnitude of the floor reference voltage varying as a function of the output voltage; and produce control output as a function of the floor reference voltage and the output voltage to control a power converter producing the output voltage.

The ordering of the operations has been added for clarity sake. The operations can be performed in any suitable order.

It is to be understood that the system, method, device, apparatus, logic, etc., as discussed herein can be embodied strictly as hardware (such as analog circuitry, digital circuitry, logic, etc.), as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein refer to a power supply which includes a floor reference voltage generator, a mode controller, and a phase controller. The floor reference voltage generator is configured to produce a floor reference voltage during operation. The phase control circuitry produces an output voltage to power a load as a function of an output voltage feedback signal derived from the output voltage of the switching power supply and of the floor reference voltage produced by the floor reference voltage generator. The mode controller is configured to switch between operating in a first operational mode and a second operational mode. In the first operational mode, the floor reference voltage is set to a predetermined voltage value. This voltage value is of constant magnitude. In the second operational mode, the magnitude of the floor reference voltage varies. For instance, in the second operational mode, the floor reference voltage has a value which varies as a function of an output voltage error of the power supply, e.g. the error between the output voltage of the power supply and an internal reference corresponding to a prescribed output voltage.

As further described herein, switching between the first operational mode and the second operational mode of controlling the floor voltage reference as discussed herein provides better output voltage regulation over the different operational modes. In one embodiment, in contrast to the first operational mode of producing the floor voltage at a fixed voltage, while in the second operational mode, the floor reference voltage generator is operable to vary a magnitude of the floor reference voltage during transient conditions in which current provided by the output voltage to a respective load varies.

Figure 1:
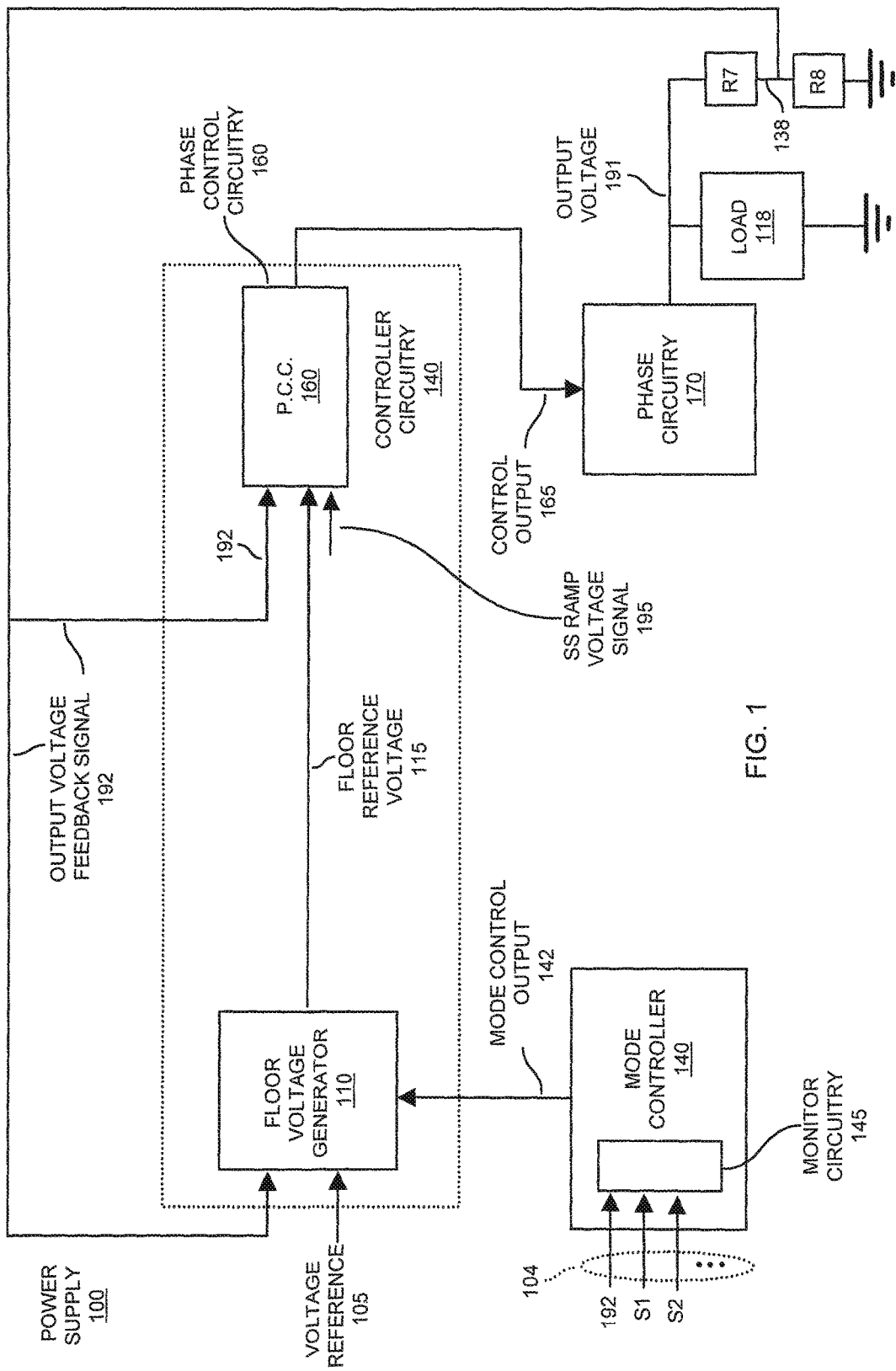
FIG. 1 is an example diagram illustrating a power supply including a floor reference voltage generator and corresponding mode controller according to embodiments herein.

Now, more specifically, FIG. 1 is an example diagram of a power supply according to embodiments herein.

As shown, embodiments herein include a floor reference voltage generator 110, mode controller 140, phase control circuitry 160, and phase circuitry 170. The floor reference voltage generator 110, and the mode controller 140 of power supply 100 typically take the form of circuitry. However, the instantiation of same may vary depending on the embodiment. The terms floor reference voltage generator circuit (ry), ramp generator circuit(ry) and mode control circuit(ry) may be used as non-limiting equivalents thereof here below.

In general, during operation, the floor reference voltage generator 110 outputs a floor reference voltage 115. In addition, the floor reference voltage generator 110 receives an output voltage feedback signal 192 as well as a reference voltage 105 (such as a fixed DC voltage setpoint). The output voltage feedback signal 192 is derived from an output voltage 191 of the power supply produced by the phase circuitry 170 and which powers a load 118.

In one embodiment, the output voltage feedback signal 192 is a ratio metric value derived from the output voltage 191. For instance, this metric is defined by [R7/(R7+R8)] *output voltage 191. R7 and R8 are resistor values that can be any suitable values depending on the embodiment.

In one embodiment, the output voltage feedback signal 192 is set to the output voltage 191.

The difference in magnitude between the output voltage feedback signal 192 and the reference voltage 105 indicates a degree to which the respective output voltage 191 of the power supply 100 is in or out of regulation.

As previously discussed, and as further discussed below, the mode controller 140 switches between operating the floor voltage generator circuit 110 in a static voltage mode (fixed floor voltage mode) and a dynamic mode (varying floor voltage mode).

Advantageously, the mode controller 140 carries out the switches based on the monitoring by monitor circuitry 145 of the mode controller 140 of one or more conditions (such as operational attributes) of the power supply 100. For instance, these conditions are monitored through one or more input 104 (such as an output voltage feedback signal 192, status information S1, S2, etc.).

In one embodiment, the monitor circuitry 145 monitors the magnitude of the output voltage 191 (via monitoring output voltage feedback signal 192). In addition or alternatively, the monitor circuitry 145 monitors an amount of current provided by output voltage 191 consumed by the load 118, monitor current through a respective one or more inductors, etc. These operating conditions are further discussed below.

Based on monitoring inputs 104, the mode controller 140 produces mode control output 142 (one or more signals) to control operation of floor voltage generator 110.

More specifically, in the static mode, the mode controller 140 outputs the mode control output 142 to control the floor generator circuit 110 to set the floor reference voltage 115 to a predetermined fixed voltage value. In the variable (dynamic) mode, the mode controller 140 produces the mode control output 142 to operate the floor voltage generator circuit 110 in variable mode in which the floor reference voltage 150 produced by the floor voltage generator circuit 110 varies over time.

The phase control circuitry 160 is configured to output a control output 165 based on which the phase circuitry 170 outputs the output voltage 191. The control output 165 is determined as a function of the output voltage feedback signal 192 and as a function of the floor reference voltage 115. By "as a function of the floor reference voltage", it is understood that the floor reference 115 may be used directly as a value used to determine the control output 165 or indirectly, e.g., as used in the definition of a value itself used directly for the determination of the control output 165.

For instance, as discussed in more details below, the output voltage feedback signal 192 and the floor reference voltage 115 are compared to one another directly to generate the control output 165, optionally also with a soft-startup voltage signal 195 during a soft-startup of the device. Advantageously, this configuration is implemented when the output voltage feedback signal 192 includes a ripple voltage component.

In another embodiment, a ramp voltage is used and is offset relative to the output voltage feedback signal 192 to form an offset ramp voltage signal, which is then compared to the floor reference voltage 115 to produce the control output 165.

In another embodiment, a ramp voltage is used and is offset relative to the floor reference voltage 115 to form an offset ramp voltage signal, which is then compared to the output voltage feedback signal 192 to produce the control output 165.

As further discussed below, the control output 165 (such as one or more control signals) is used as a basis to control phase circuitry 170 (such as a one or more switching phases of power supply 100) for producing the output voltage 191. In other words, based on control output 165 (such as pulse width modulation control information), the phase circuitry 170 produces the output voltage 191 to power the respective load 118.

The power supply 100 also includes a circuit configured to output the output voltage feedback signal 192, which is used as a basis to generate the floor reference voltage 115 and the control output 165. As previously discussed, this circuit may take the form of a voltage divider circuit including resistor R7 and resistor R8. For instance, the center tap node 138 of the voltage divider circuit outputs the output voltage feedback 192.

Figure 2:
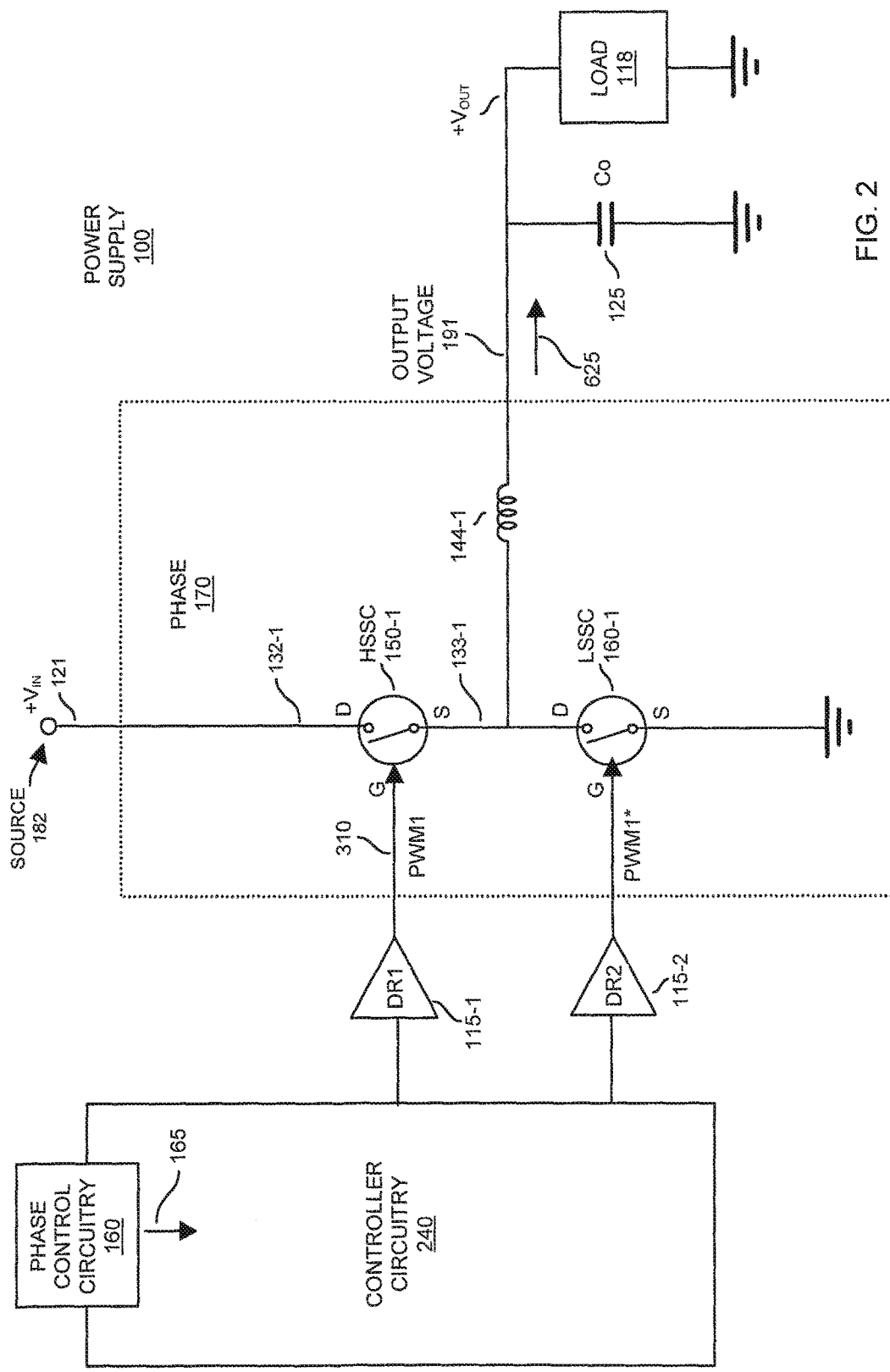
FIG. 2 is an example diagram illustrating a power converter circuit (such as including one phase) of a power supply according to embodiments herein.

The following FIG. 2 illustrates an example of phase circuitry 170 to produce the output voltage 191 based on control output 165 in a buck configuration for a given phase of the power supply.

As shown in FIG. 2, the phase circuitry 170 to generate output voltage 191 includes driver circuitry 115-1, driver circuitry 115-2, high side switch circuitry 150-1 (such as a control switch or switches), low side switch circuitry 160-1 (such as a synchronous switch or switches), controller circuitry 240 and inductor 144-1. Control output 165 serves as a basis to control high side switch circuitry 150-1 and low side switch circuitry 160-1.

Note that switch circuitry 150-1, 160-1 can be any suitable type of switch resource (field effect transistors, bipolar junction transistors, etc.). In one embodiment, each of the high side switch circuitry 150-1 and low side switch circuitry 160-1 are power MOSFET (Metal Oxide Semiconductor Field Effect Transistor) or other suitable switch devices.

Appropriate switching of the high side switch circuitry 150-1 and the low side switch circuitry 160-1 results in generation of the output voltage 191 as is known in a conventional DC-DC converter such as a buck converter.

Typically, the controller circuitry 240 receives control output 165 from phase control circuitry 160 and, on this basis, controls the driver circuitry 115-1 to produce a PWM control signal 310 (PWM1) to control high side switch circuitry 150-1 and a PWM control signal (PWM1*) to control low-side switch circuitry 160-1. In general, the low side switch circuitry 160-1 is activated (closed or ON) when the high side switch circuitry 150-1 is deactivated (open or OFF), and vice versa.

Additional details of controlling the high side switch circuitry 150-1 and the low side switch circuitry 160-1 are further discussed below.

As further discussed herein, the phase control circuitry 160 (of FIG. 1) can be configured to compare the floor reference voltage 115 and the output voltage feedback signal 192 in a manner as previously discussed to determine timing of activating high side switch circuitry 150-1 of the respective phase in the phase circuitry 170 to an ON (closed switch) state. For example, the floor reference voltage 115 serves as a threshold value.

In one embodiment, when the magnitude of the output voltage feedback signal 192 crosses or falls below a magnitude of the floor reference voltage 115 (or when the magnitude of the an output voltage feedback signal 192 is substantially equal to the magnitude of the soft start signal), the phase control circuitry 160 produces the control output 165 to turn ON the high slide switch circuitry 150-1 (at which time the low side switch circuit 160-1 is turned OFF).

Note further that the power supply 100 and corresponding phase 170-1 can be operated in a so-called constant ON-time control mode in which the PWM (Pulse Width Modulation) setting of the ON-time of control pulses of switch circuitry (such as high side switch circuitry 150-1) in a phase is constant or fixed; the OFF time of high side switch circuitry 150-1 varies depending upon a subsequent cycle of comparing the floor reference voltage 115 to the output voltage feedback signal 192 and issuance of pulsing the high side switch circuitry 150-1 ON again via subsequent generate fixed pulse width switch control signals. If the decay of the magnitude of the output voltage 191 is slow, the frequency of pulsing the high side switch circuitry 150-1 ON again decreases.

Thus, in the constant ON-time control mode in which the ON-time of activating the high side switch circuitry is a fixed or predetermined value, the frequency of activating the high side switch varies to maintain the output voltage 191 to a desired set point.

Figure 3:
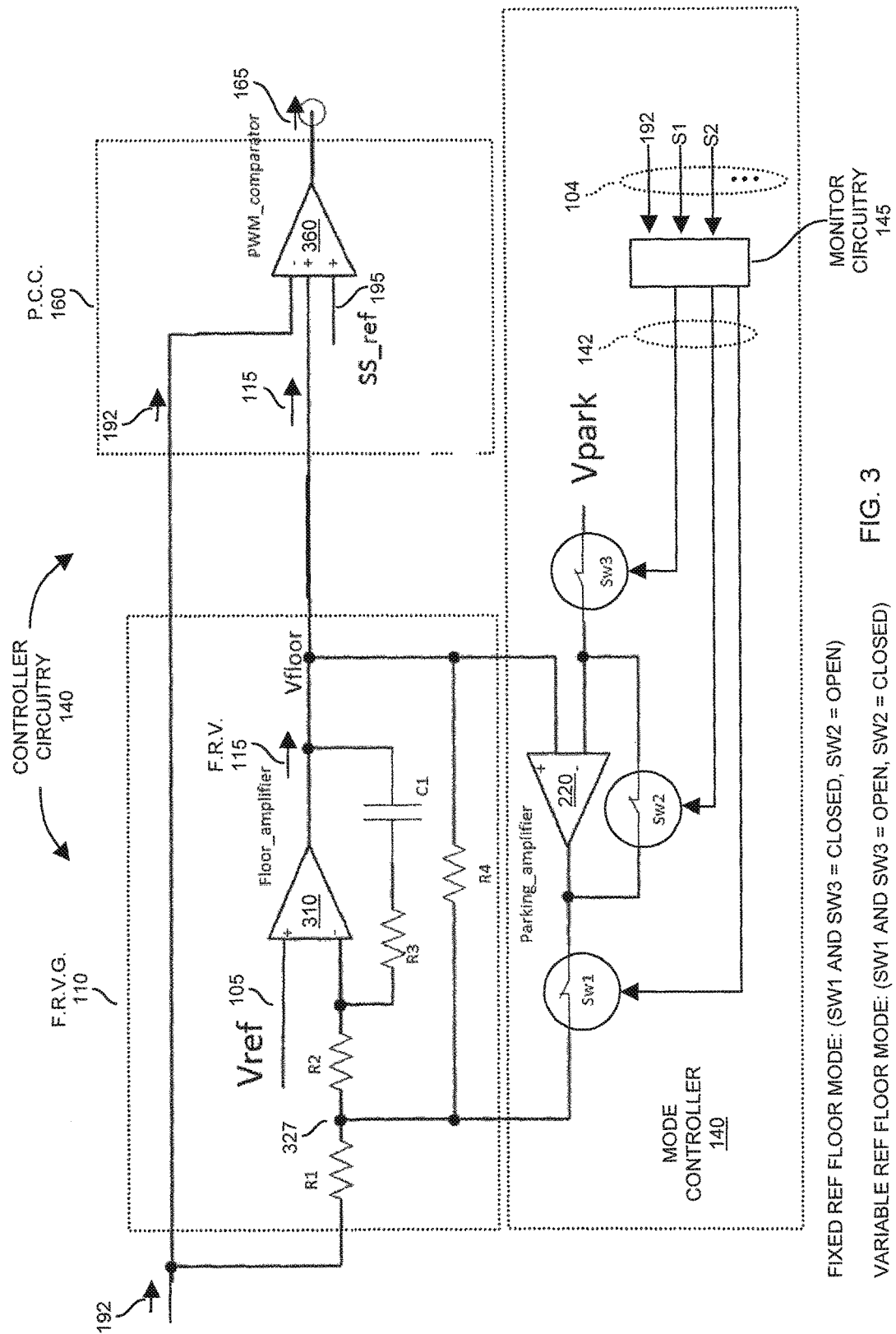
FIG. 3 is an example diagram illustrating a power supply and related circuitry according to embodiments herein.

FIG. 3 is an example diagram illustrating the details of the floor reference voltage generator, mode controller, and of the phase control circuitry according to embodiments herein.

In the non-limiting example embodiment of FIG. 3, the floor reference voltage generator 110 includes amplifier 310 and a configuration of resistors R1, R2, R3, R4, as well as capacitor C1 in a feedback path between the output of amplifier 310 and the non-inverting input of the amplifier 310.

For instance, the reference voltage generator 110 is configured so as to include a first (outer) gain path (such as combination of resistors R1 and R4) for DC signal gain and a second (inner) gain path (resistors R1 and R2, resistor R3 and capacitor C1) for AC signal gain.

In this example embodiment, the first gain path provides DC (Direct Current) gain of −R4/R1; the second gain path provides AC (Alternating Current) gain −R3/[R1+R2]. In one embodiment, the magnitude of the DC gain provided by the first gain path is substantially higher than a magnitude of the AC gain provided by the second gain path.

In addition to the use of voltage mode amplifier 310, the settings of the passive components R1, R2, R3, R4, and C1 are chosen so as to ensure large DC gain and low high frequency gain to improve overall system accuracy of generating the output voltage 191 at a desired setpoint or within a desired voltage range. Such a configuration also avoids instability.

As previously discussed, the floor reference voltage generator 110 produces floor reference voltage 115 having a magnitude, which depends on a mode selected by mode controller 140.

The mode controller 140 includes amplifier 220, switches SW1, SW2, and SW3, as well as monitor circuitry 145. The mode controller 140 controls an operational mode setting of the floor reference voltage generator 110 based on settings of switches SW1, SW2, and SW3.

As previously discussed, the monitor circuit 145 monitors one or more power supply conditions to determine in which state (fixed or variable mode) to operate the floor reference voltage generator 110.

During operation, a reference voltage Vpark (such as a predetermined fixed DC voltage value) is selectively coupled to the inverting input of the amplifier 220 via switch SW3. As further shown, the non-inverting input of the amplifier 220 is connected to receive the floor reference voltage 115.

In one embodiment, to operate the floor reference voltage generator 110 in the fixed voltage floor mode, the mode controller 140 sets each of the switches SW1 and SW3 to an ON state (closed, providing very low resistive path) and switch SW2 to an OFF state (open, providing a high resistive path). In such an instance, the mode control output 142 (such as a floor voltage override signal) outputted from the amplifier 220 to node 327 overrides the output voltage feedback signal 192 such that the floor reference voltage generator 110 produces the floor reference voltage 115 to be a predetermined fixed DC voltage value, such as Vpark. For instance, Vpark has a value of 550 mV DC (milliVolts) or other suitable setpoint value.

In accordance with further embodiments, to operate the floor reference voltage generator 110 in the variable voltage floor mode, the mode controller 140 sets each of the switches SW1 and SW3 to an OFF state (opened, providing very high resistive path) and switch SW2 to an ON state (closed, providing a low resistive path). In such an instance, the amplifier 220 no longer drives a feedback path (specifically node 327) of the floor reference voltage generator 110. Instead, the amplifier 220 is set to operate in a unity gain mode in which the output of the amplifier 220 follows (tracks) the floor reference voltage 115 inputted to the non-inverting input of amplifier 220. As previously discussed, in the unity gain mode, closed switch SW2 connects the output of the amplifier 220 to the inverting input of the amplifier 220. Open switch SW1 ensures that the output of the amplifier 220 does not drive node 327 between resistor R1 and resistor R2. Thus, in the variable floor mode, the amplifier 220 can be configured as a tracking circuit operable to track the floor reference voltage 115.

Additionally, in the variable floor voltage mode, the output of the amplifier 220 is disconnected from driving the feedback path (such as node 327 or resistor R4) of floor reference voltage generator 110. In such an instance, the amplifier 310 produces the floor reference voltage 115 based upon a magnitude of reference voltage 105 and variations in the magnitude of the output voltage feedback signal 192.

Note further that, when the mode controller 140 switches back to operating the floor voltage generator circuit 110 from the variable voltage floor mode to the fixed voltage floor mode, the amplifier 310 produces the mode control output 142 to at least initially drive the node 327 between resistor R1 and resistor R2 with the previously tracked voltage value of the amplifier 220 in the unity gain mode. As previously discussed, in the static voltage floor mode, the amplifier 220 causes the floor reference voltage generator 110 to drive the floor reference voltage 115 to voltage, Vpark (such as 550 mVDC).

Conditions in which the mode controller 140 switches between modes is further discussed below.

In accordance with further embodiments, regardless of the selected floor voltage generator mode, comparator 360 compares the received output voltage feedback signal 192 to the smaller magnitude of the floor reference voltage 115 to produce output control 165.

Advantageously, in a form of this embodiment, the output voltage feedback signal 192 includes a ripple voltage component in at least one operational mode of the power supply. In this or these operational modes, the output voltage feedback signal 192 is compared to the floor reference voltage Vfloor to produce the output control 165 for producing the output voltage.

In a specific configuration, for instance implemented during a start-up mode, the output voltage feedback signal 192 is compared to the floor reference voltage Vfloor and to a the soft start reference 195 to produce output control 165. As discussed in more details below, the soft start reference 195 may take the form of a linear ramp signal having a portion below the floor reference voltage, and a portion above it.

Figure 4:
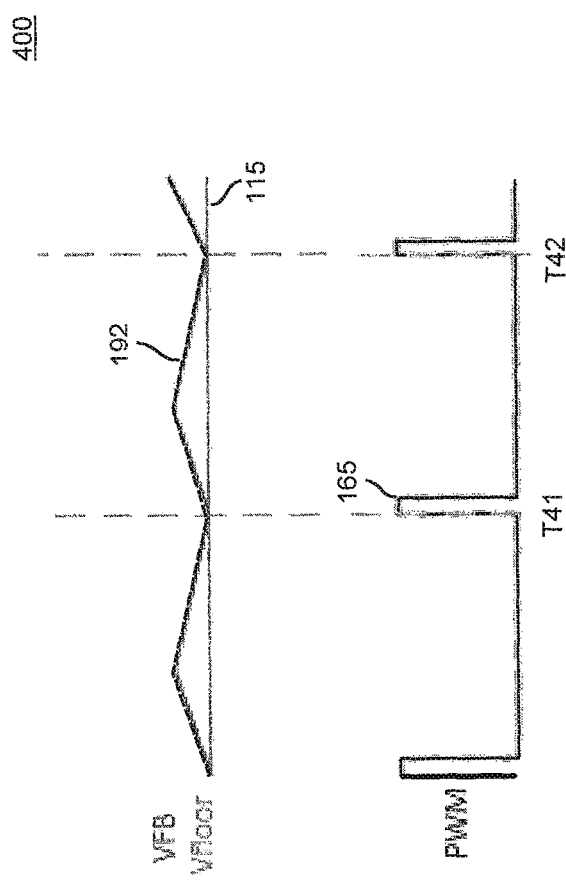
FIG. 4 is an example diagram illustrating a timing diagram according to embodiments herein.

FIG. 4 is an example diagram illustrating a timing diagram according to embodiments herein in particular that of FIG. 3.

As previously discussed, the floor reference voltage 115 may be a static or varying voltage depending on the mode selected by mode controller 140.

During operation, as shown at time T41, the comparator 360 detects that the magnitude of the output voltage feedback signal 192 which includes a ripple voltage component is substantially equal to the magnitude of the floor reference voltage 115. In response to detecting such a condition, the comparator 360 produces output control 165 to activate high side switch circuitry 150-1 in the power supply 100. The switching of the high side switch circuitry 150-1 for a predetermined ON-time causes the magnitude of the output voltage to increase again.

Eventually, after completion of the pulse, consumption of current by the load 118 causes the magnitude of the output voltage feedback signal 100 times to decrease again. At or around time T42, the comparator 360 detects that the magnitude of the output voltage feedback signal 192 is substantially equal to the magnitude of the floor reference voltage 115 again. In response to detecting such a condition, the switching of the high side switch circuitry 150-1 for a predetermined ON-time causes the magnitude of the output voltage to increase again. The switching of the high side switch circuitry 150-1 for predetermined ON-time causes the magnitude of the output voltage to increase again.

The cycles above are repeated to maintain the magnitude of the output voltage 191 in a desired range.

Figure 5:
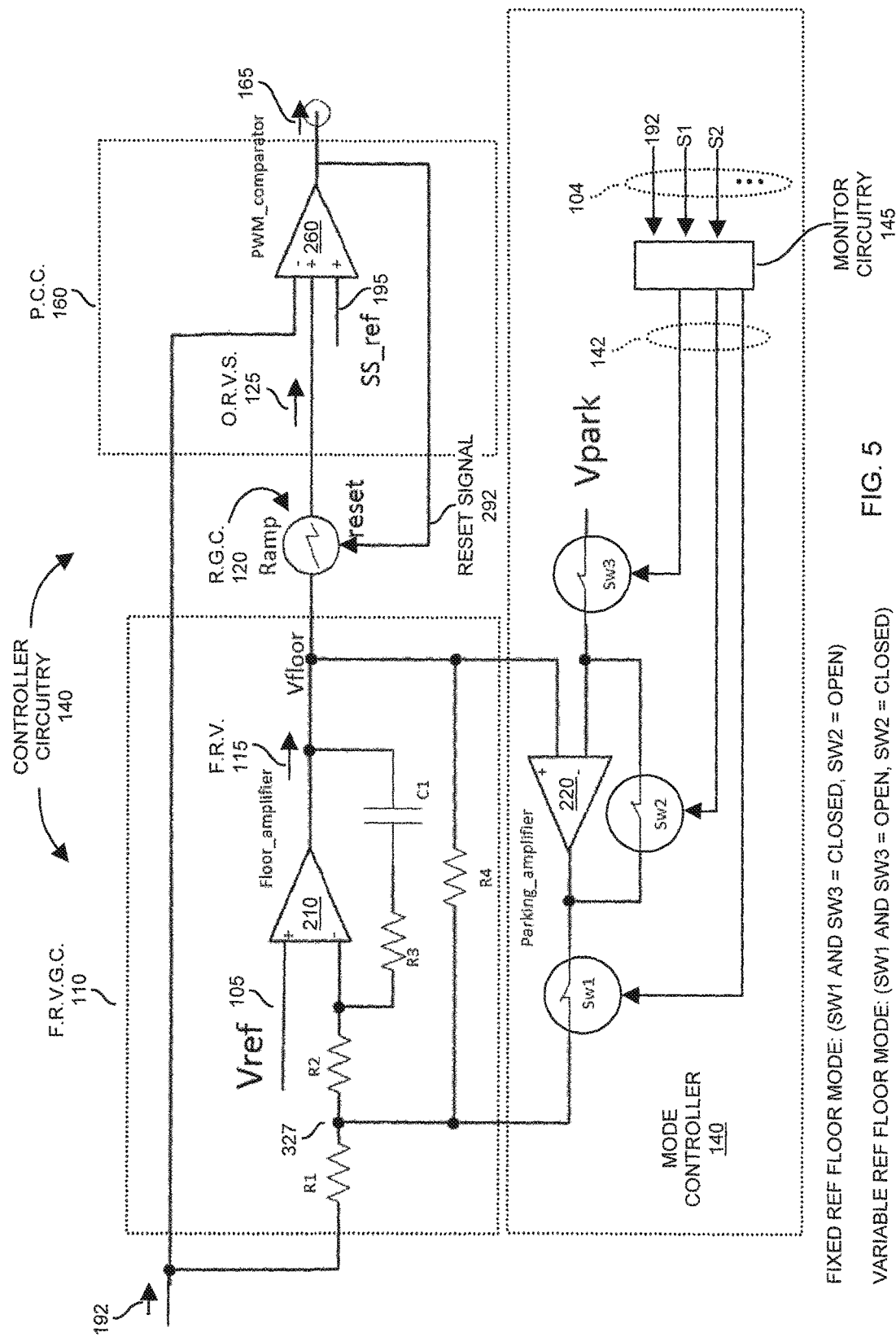
FIG. 5 is an example diagram illustrating power supply monitor and mode controller according to embodiments herein.

FIG. 5 is an example diagram illustrating the details of the floor reference voltage generator 110, of the mode controller 140, and of the phase control circuitry 160 according to embodiments herein. Note that this embodiment includes a ramp generator 120 that produces an offset ramp voltage signal 125 with respect to the floor reference voltage 115.

In the non-limiting example embodiment of FIG. 5, the floor reference voltage generator 110 includes amplifier 210 and a configuration of resistors R1, R2, R3, R4, as well as capacitor C1 in a feedback path between the output of amplifier 210 and the non-inverting input of the amplifier 210. As previously discussed, the floor reference voltage generator 110 produces floor reference voltage 115 having a magnitude which depends on a mode selected by mode controller 140.

As previously discussed, the mode controller 140 includes amplifier 220, switches SW1, SW2, and SW3, as well as monitor circuitry 145. The mode controller 140 controls an operational mode setting of the floor reference voltage generator 110 based on settings of switches SW1, SW2, and SW3. As previously discussed, the monitor circuit 145 monitors one or more power supply conditions to determine in which state (fixed or variable mode) to operate the floor reference voltage generator 110.

During operation, a reference voltage Vpark (such as a fixed DC voltage value) is selectively coupled to the inverting input of the amplifier 220 via switch, SW3. As further shown, the non-inverting input of the amplifier 220 is connected to receive the floor reference voltage 115.

In one embodiment, to operate the floor reference voltage generator 110 in the fixed voltage floor mode, the mode controller 140 sets each of the switches SW1 and SW3 to an ON state (closed, providing very low resistive path) and switch SW2 to an OFF state (open, providing a high resistive path). In such an instance, the mode control output 142 (such as a floor voltage override signal) outputted from the amplifier 220 to node 327 overrides the output voltage feedback signal 192 such that the floor reference voltage generator 110 produces the floor reference voltage 115 to be a fixed DC voltage value, Vpark. For instance, Vpark has a value of 550 mV DC (milliVolts DC).

In accordance with further embodiments, to operate the floor reference voltage generator 110 in the variable voltage floor mode, the mode controller 140 sets each of the switches SW1 and SW3 to an OFF state (opened, providing very high resistive path) and switch SW2 to an ON state (closed, providing a low resistive path). In such an instance, the amplifier 220 no longer drives a feedback path (specifically node 327) of the floor reference voltage generator 110. Instead, the amplifier 220 is set to operate in a unity gain mode in which the output of the amplifier 220 follows (tracks) the floor reference voltage 115 inputted to the non-inverting input of amplifier 220. As previously discussed, in the unity gain mode, closed switch SW2 connects the output of the amplifier 220 to the inverting input of the amplifier 220. Open switch SW1 ensures that the output of the amplifier 220 does not drive node 327 between resistor R1 and resistor R2. Thus, in the variable floor mode, the amplifier 220 can be configured as a tracking circuit operable to track the floor reference voltage 115.

Additionally, in the variable floor voltage mode, the output of the amplifier 220 is disconnected from driving the feedback path (such as node 327 or resistor R4) of floor reference voltage generator 110. In such an instance, the amplifier 210 produces the floor reference voltage 115 based upon a magnitude of reference voltage 105 and variations in the magnitude of the output voltage feedback signal 192.

Note further that when the mode controller 140 switches back to operating the floor voltage generator circuit 110 from the variable voltage floor mode to the fixed voltage floor mode, the amplifier 220 produces the mode control output 142 to at least initially drive the node 327 between resistor R1 and resistor R2 with the previously tracked voltage value of the amplifier 220 in the unity gain mode. As previously discussed, in the static voltage floor mode, the amplifier 220 causes the floor reference voltage generator 110 to drive the floor reference voltage 115 to voltage, Vpark (such as 550 mVDC).

During operation, ramp generator 120 produces an offset ramp voltage signal 125, a magnitude of which is offset by the received floor reference voltage 115. In other words, the offset ramp voltage signal 125 is in the form of a ramp signal, which uses the floor reference voltage 115 as a reference. For instance, the ramp generator includes a module for generating a ramp signal and a summer circuit to combine the ramp signal to the floor reference voltage 115, for instance by addition.

In one embodiment, the floor reference voltage 115 serves as a varying or static reference or ground voltage for the ramp generator 120 depending on mode controller 140.

The offset ramp voltage signal 125 produced by the ramp generator 120 is offset by a varying or fixed amount depending on the mode selected by the mode controller 140.

In accordance with further embodiments, regardless of the selected floor voltage generator mode, comparator 260 compares the received output voltage feedback signal 192 to the smaller magnitude of the offset ramp voltage signal 125 and the soft start reference 195 to produce output control 165.

Ramp reset signal 292 resets the magnitude of the ramp voltage each time the high side switch circuitry 150-1 is pulsed ON.

Figure 6:
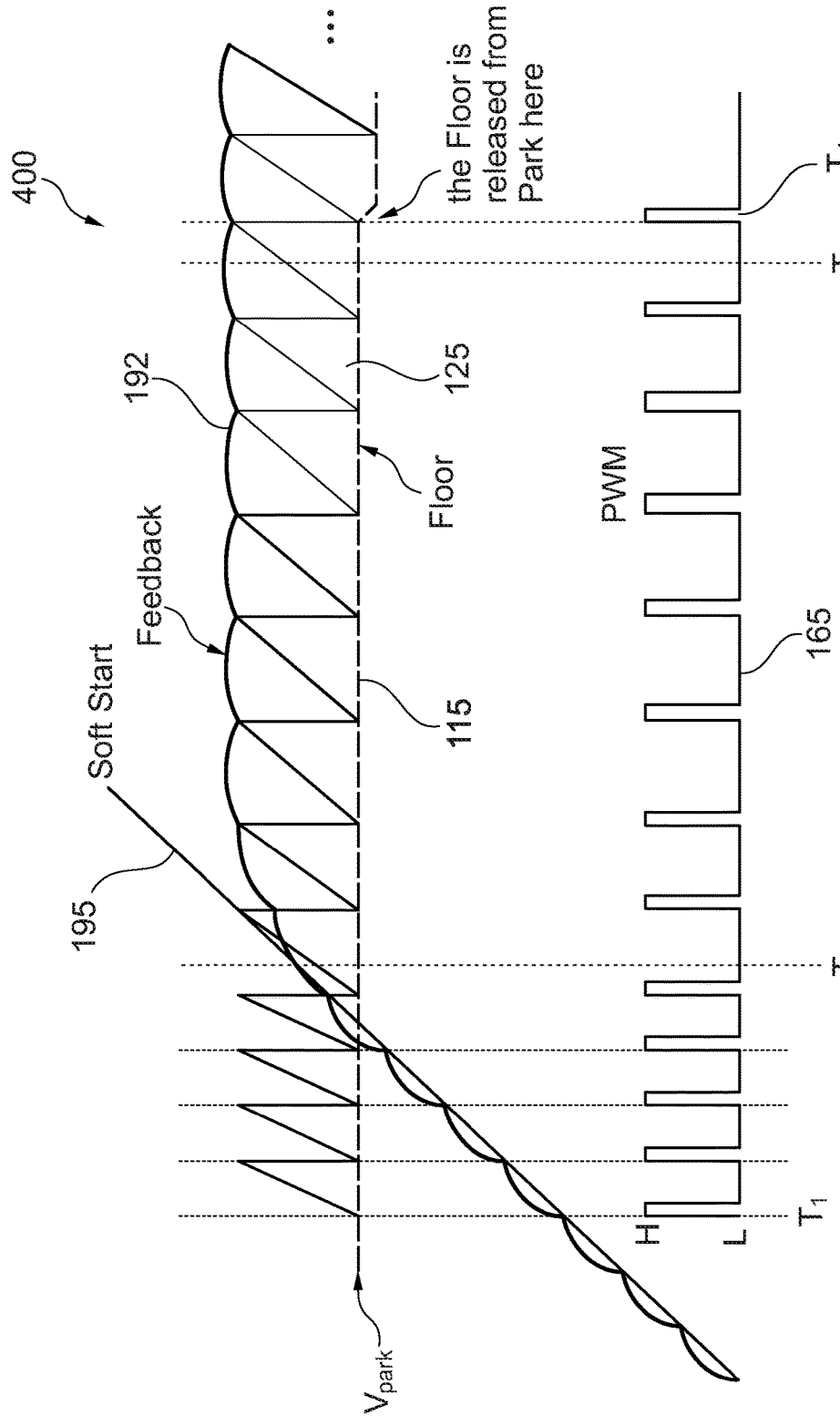
FIG. 6 is an example timing-diagram illustrating multi-mode operation of controlling a floor voltage reference generator according to embodiments herein.

FIG. 6 is an example timing-diagram illustrating the multi-mode operation of controlling a floor reference voltage generator according to embodiments herein. Note that discussion of FIG. 6 will occasionally reference matter discussed in prior figures.

In one embodiment, as previously discussed, in normal mode (such as Continuous Conduction Mode, CCM) of power supply 100, the amplifier 220 of mode controller 140 is disconnected from the control loop or feedback path of floor reference voltage generator 110 by opening switches SW1 and SW3 and closing switch SW2. In such an instance, in the variable voltage floor mode, the amplifier 220 operates in a unity gain mode, tracking the floor reference voltage 115 produced by amplifier 210. Further, as previously discussed, in the variable floor mode, the floor reference voltage 115 produced by the amplifier 210 varies depending on a magnitude of the output voltage feedback signal 192 (inputted to the inverting input of amplifier 210) and precise setpoint of reference voltage 105 (inputted to the non-inverting input of the amplifier 210).

In general, during operation of the power supply 100 in the variable floor voltage mode, if a magnitude of the output voltage feedback signal 192 droops, then magnitude of the floor reference voltage 115 rises, causing an increase in converter switching frequency. If the magnitude of the output voltage feedback signal 192 rises, then the floor reference voltage 115 decreases, thereby reducing the converter switching frequency. Thus, the higher switching frequency of activating high side switch circuitry 150-1 and low side switch circuitry 160-1 results in a higher voltage, a lower switching frequency of the converter results in a lower voltage.

In one embodiment, during a so-called soft start condition, such as when the magnitude of the output voltage 191 is below a desired threshold value and potentially ramping up, the mode controller 140 controls switches SW1 and SW3 to be closed and controls switch SW2 to an open state. As shown in the timing diagram 400 of FIG. 4, prior to time T2, the floor reference voltage 115 is forced to a predetermined value such as Vpark, which is inputted through switch SW3 to the non-inverting input of amplifier 220.

As shown in FIG. 5, the phase control circuitry 160 includes comparator 260 to compare the output voltage feedback signal 192 (received on negative input of compression 260) to the reference voltage offset ramp voltage signal 125 or soft start reference signal 195 as further discussed below.

Prior to time T2, when a soft start reference signal 195 is ramping up, the comparator 260 of phase control circuitry 160 compares the output voltage feedback signal 192 to the soft start reference signal 195 (because it is of a lower magnitude than the offset ramp voltage signal 125) to produce control output 165. In such an instance, the start up speed and corresponding magnitude of the output voltage 191 is fully controlled by the ramp rate of the soft start reference signal 195. As previously discussed, the soft start signal 195 is inputted to the second non-inverting input of comparator 260 of phase control circuitry 160 (a.k.a., PWM comparator circuit). The lower magnitude of the offset ramp voltage signal 120 and the soft start reference signal 195 is used by the comparator 260 as a threshold reference to produce the control output 165.

As further shown, prior to time T2, the soft start reference signal 195 starts at a low voltage and linearly ramps to a final target well above the regulation voltage of the an output voltage feedback signal 192. In one embodiment, the phase control circuitry 160 does not issue a pulse until the soft start reference signal 195 rises to a level above the feedback voltage defined by the pre-bias voltage. The output voltage feedback signal 192 then will rise with the soft start reference signal 195 until the soft start signal 195 crosses the offset ramp voltage signal 125, at which point the offset ramp voltage signal 192 becomes the dominant reference used by the comparator 260 to generate the output control 165. Thus, at or around time T2, the phase control circuitry 160 recognizes that soft start reference signal 195 has completed.

As previously discussed, the monitor circuit 145 monitors a magnitude of the output voltage 191. In response to detecting that the magnitude of the output voltage 191 is within a regulation range for a threshold amount of time, such as at or around time T4, the mode controller 140 switches over to operating the floor reference voltage generator 110 in the variable floor mode. As previously discussed, switching over to the variable floor voltage mode (mode #2) includes opening switches SW1 and SW3 and closing switch SW3. In a manner as previously discussed, the floor voltage reference 115 varies after time T4 based on a magnitude of the output voltage feedback signal 192.

As previously discussed, in mode #2 (variable voltage floor mode), closing switch SW2 sets the amplifier 220 into a unity gain mode in which the output of the amplifier 220 tracks the magnitude of the floor reference voltage 115.

Figure 7:
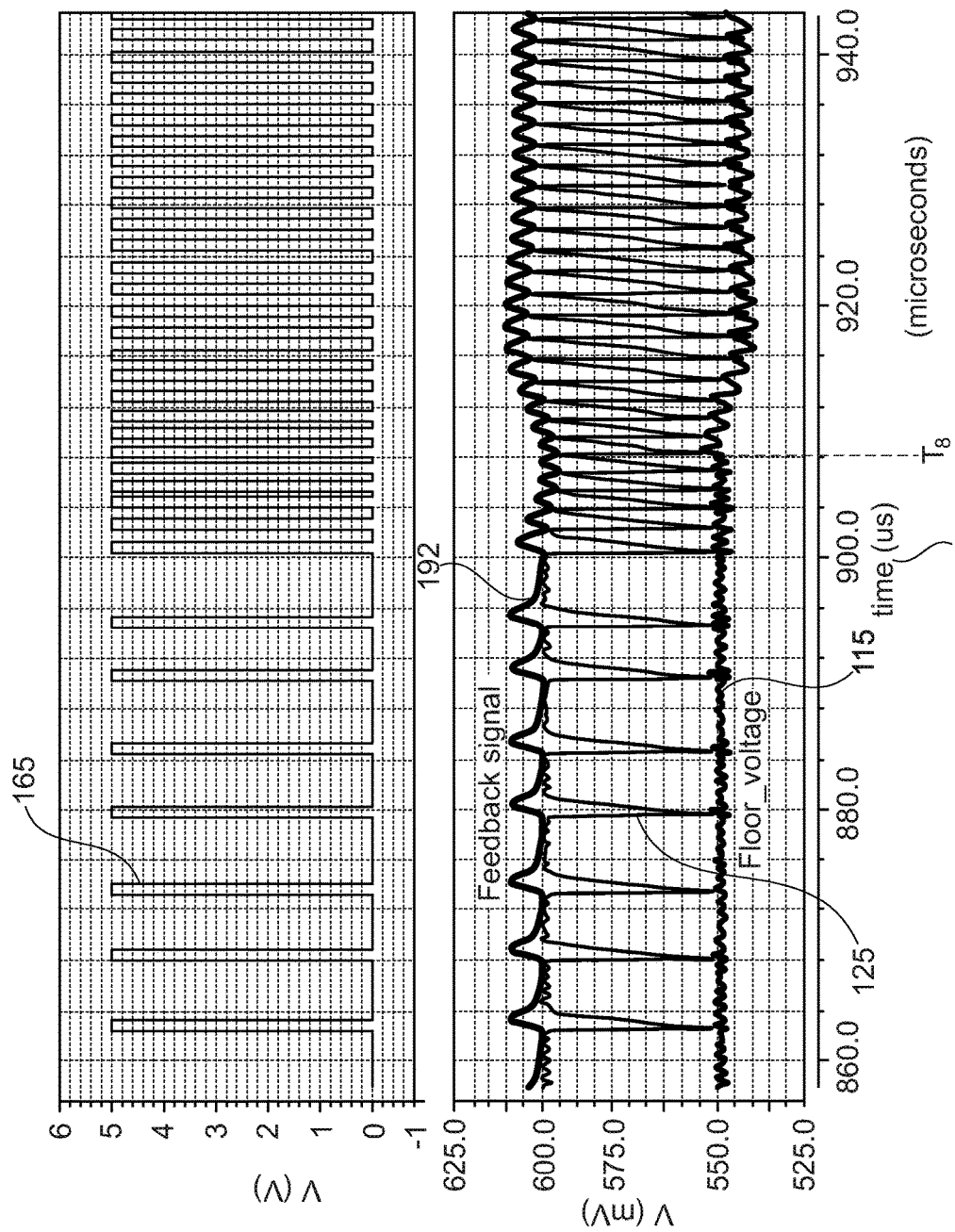
FIG. 7 is an example timing-diagram illustrating switchover from operating in a fixed or static floor voltage mode to operating in a variable floor voltage mode according to embodiments herein.

FIG. 7 is an example timing diagram illustrating switchover from operating in a constant (static) floor voltage mode to operating in a variable (active) floor voltage mode according to embodiments herein.

As shown in FIG. 5, during diode emulation mode during which the load 118 consumes a small amount of current prior to time T7, the phase control circuitry 160 operates in a discontinuous operation mode also known as Diode Emulation mode. In this mode, due to low or no current consumption by the load 118, the magnitude of the output voltage feedback signal 192 can remain above the regulation reference and offset ramp voltage signal 125 for a significant amount of time without activating the high side switch circuitry 150-1 again. Low side switch circuitry 160-1 is not activated in the diode emulation mode (such as prior to time T8). Optionally, as in the configuration shown, the offset ramp voltage signal 125 is clamped to a predetermined fixed voltage, for instance of 600 millivolts. Accordingly, the offset ramp voltage signal 125 is cyclical; each cycle of the ramp voltage signal 125 has a monotonous portion during which the ramp voltage signal increases or decreases, and a clamped portion in which a magnitude of the ramp voltage signal is substantially constant (such as 600 millivolts). One embodiment herein includes monitoring a parameter such as the amount of current delivered to the load via the output voltage 191. During a condition in which the monitor circuit 145 detects that the supplied current (such as current through the inductor 144-1) is below a threshold value, or when the current is negative flowing from capacitor 125 through inductor 144-1 to node 133-1, the mode controller 140 operates in the fixed floor voltage mode (mode #1) during which switches SW1 and SW3 are closed and switch SW2 is open.

In a manner as previously discussed, operation in the fixed voltage floor mode causes the floor reference voltage 115 to be set to the reference voltage Vpark, (such as 550 mV). Thus, embodiments herein can include operating in the fixed floor voltage mode when Diode Emulation is recognized, preventing the disturbance of the regulated output voltage 191.

When the monitor circuit 145 detects that the load 118 consumes substantial current from the generated output voltage 191 again, such as above a threshold value amount of current or a voltage droop of the output voltage 191 below a threshold value occurs, the mode controller 140 switches to operating in the variable floor mode (mode #2) during which switches S1 and S3 are opened and switch S2 is closed.

With more specific reference to the timing diagram 500 shown in FIG. 5, prior to time T7, in a manner as previously discussed, the mode controller 140 controls the floor reference voltage generator 110 to operate in the fixed floor voltage mode (mode #1). In such an instance, the floor reference voltage 115 is set to Vpark (such as 550 mV).

Monitor circuit 145 monitors one or more parameters such as a flow of current supplied by the output voltage 191, magnitude of the output voltage 191, etc., to the load 118.

Subsequent to detecting occurrence of one or more conditions such as an increase in current consumption or droop in the magnitude of the output voltage 191 below a threshold value at, around, or for a duration of time before time T8, mode controller 140 switches over to operating the floor reference voltage generator 110 in the variable (active) floor mode (mode #2) in which the floor reference voltage 115 varies depending on the magnitude of the output voltage 191 (or an output voltage feedback signal 192).

Thus, after time T8, when the load 118 consumes substantial current from the output voltage 191, the phase control circuitry 160 produces the output control 165 to more frequently activate high side switch circuitry 150-1 for the constant ON time pulse durations to maintain the output voltage 191 within a desired range.

Figure 8:
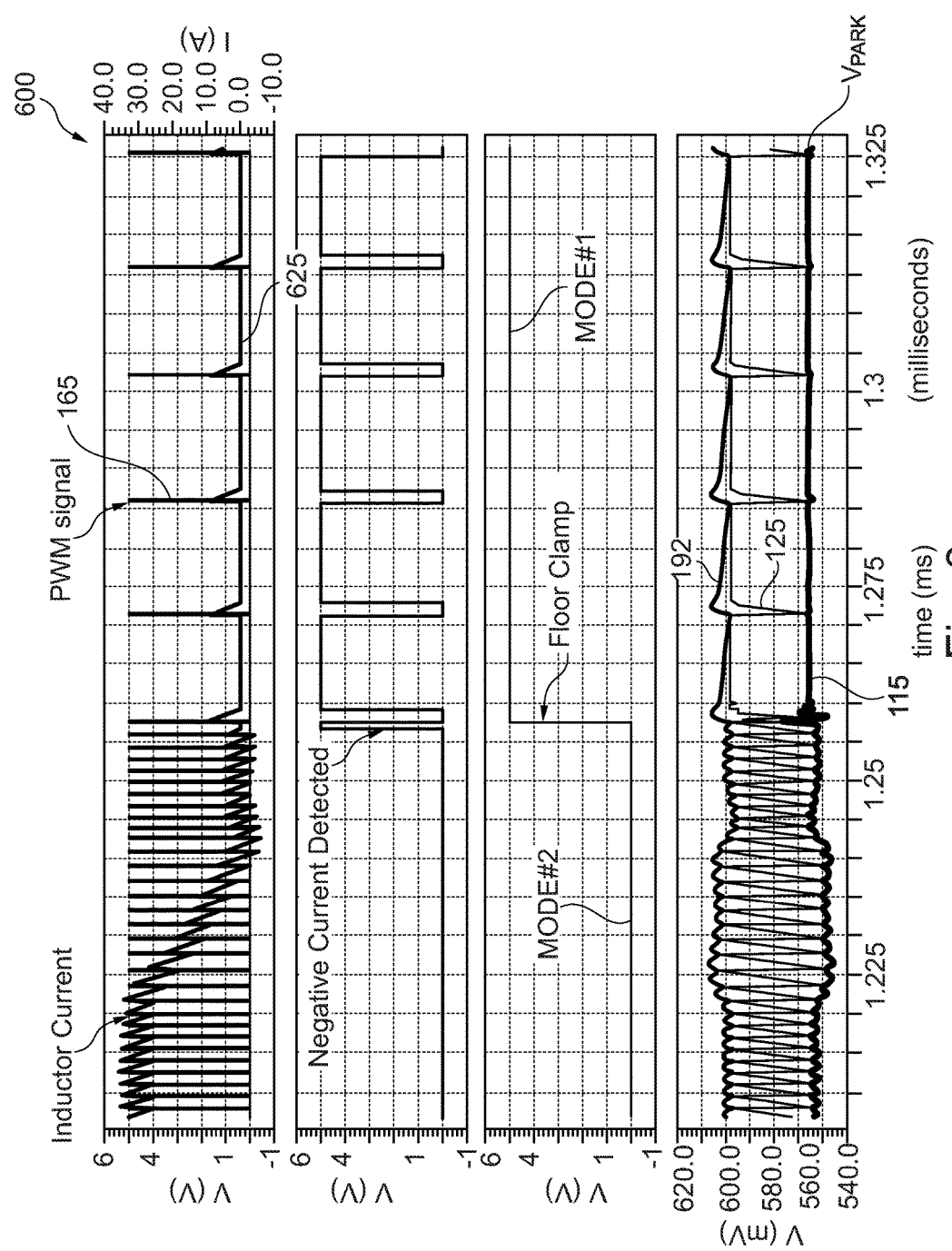
FIG. 8 is an example timing-diagram illustrating switchover from operating in a variable floor voltage mode to operating in a fixed floor voltage mode according to embodiments herein.

FIG. 8 is an example timing diagram illustrating switchover from operating in a variable floor voltage mode (mode #2) to operating in a fixed floor voltage mode (mode #1) according to embodiments herein.

As shown in FIG. 8, if the load 118 powered by the output voltage 191 drops to a light or even zero load (little or no current consumption), the phase control circuitry 160 will enter a discontinuous operation mode known as Diode Emulation. In this mode, due to low or no current consumption by the load 118, the magnitude of the output voltage feedback signal 192 can stay above the regulation reference and offset ramp voltage signal 125 for a significant amount of time. During this time, if the floor reference voltage 115 is not set to the fixed value (Vpark) such as 550 mV, the floor reference voltage 125 could sink to a voltage much lower than required, causing a significant droop and a slow recovery in the regulator output voltage (output voltage 191) when the load 118 consumes substantial current again.

Accordingly, one embodiment herein includes monitoring the amount of current through the inductor 144-1. During a condition in which the monitor circuit 145 detects that the current through the inductor 144-1 is negative, the mode controller 140 switches from operating in the variable floor voltage mode (mode #2) to operating the floor reference voltage generator 110 in the fixed floor voltage mode (mode #1) during which switches S1 and S3 are closed and switch S2 is open.

In a manner as previously discussed, operation in the fixed voltage floor mode causes the floor reference voltage 115 to be set to the voltage Vpark (such as 550 mV). Thus, embodiments herein include immediately switching to the fixed floor voltage mode when Diode Emulation is recognized, preventing the disturbance of the regulated output voltage 191.

When the monitor circuit 145 detects that the load 118 consumes substantial current from the generated output voltage 191 again, such as above a threshold value amount of current, the mode controller 140 switches to operating in the variable floor mode again during which switches S1 and S3 are opened and switch S2 is closed.

With more specific reference to the timing diagram 600 shown in FIG. 6, prior to time T10, in a manner as previously discussed, the mode controller 140 controls the floor reference voltage generator 110 to operate in the variable floor voltage mode (mode #2). In such an instance, as shown in FIG. 6, the floor reference voltage 115 varies. Monitor circuit 145 monitors a flow of current 625 through inductor 144-1. Subsequent to detecting occurrence of negative inductor current 625 (through inductor 144-1 in FIG. 2) in which current flows from the output capacitor 125 through the inductor 144-1 to the node 133-1 at, around, or for a duration of time before time T10, mode controller 140 switches over to operating the floor reference voltage generator 110 in the fixed floor mode (mode #1) in which the floor reference voltage 115 is set to Vpark (such as 550 mV) in a manner as previously discussed.

After time T10, when the load 118 consumes so little current from the output voltage 191, the phase control circuitry 160 in control circuitry 240 (FIG. 2) only occasionally activates the high side switch circuitry 150-1 for a predetermined ON time during each ramp cycle, while low side switch circuitry 160-1 is set to an open state.

Figure 9:
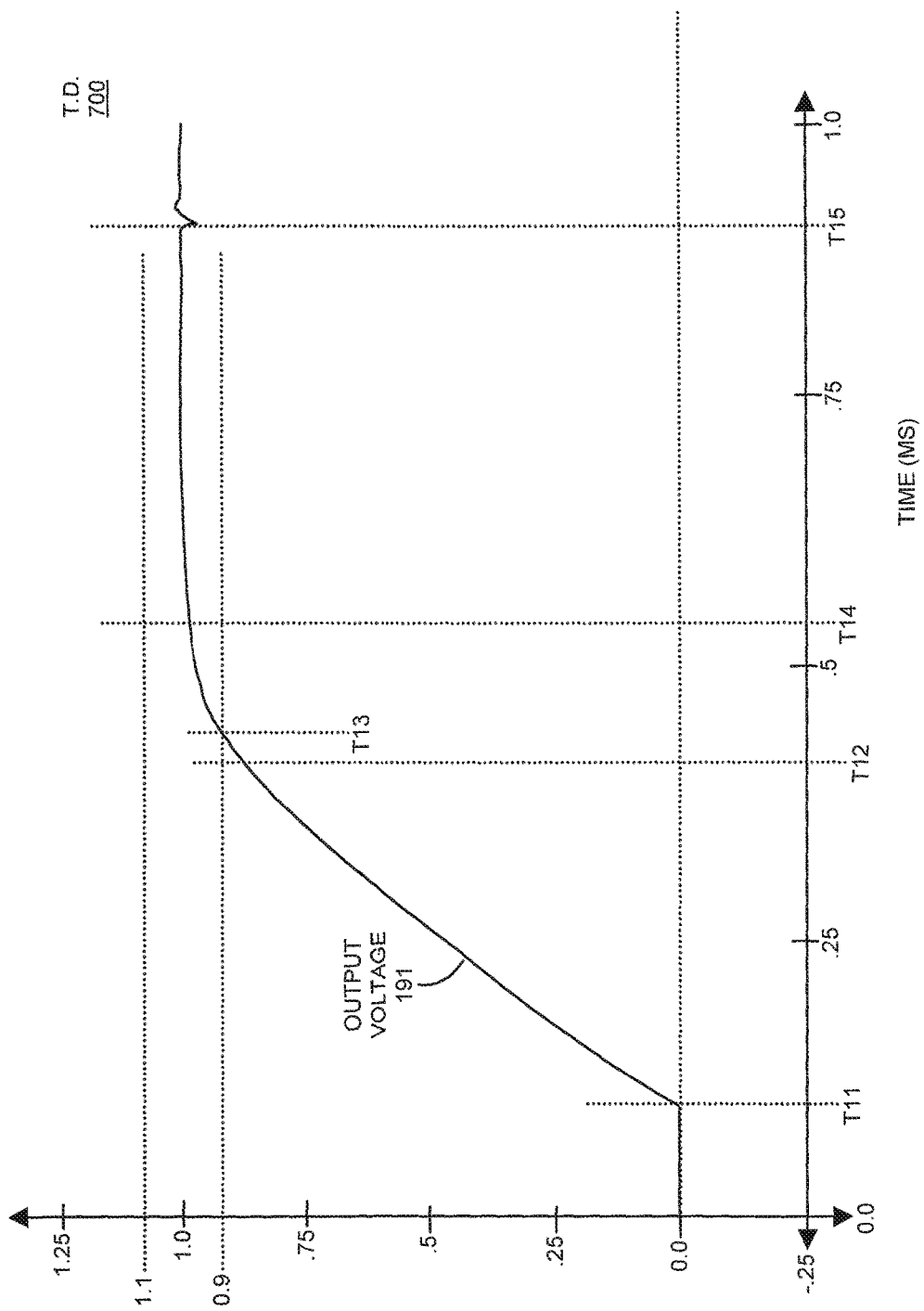
FIG. 9 is an example timing-diagram illustrating multi-mode generation of an output voltage to power a load according to embodiments herein.

FIG. 9 is an example timing diagram illustrating multi-mode ramp up of an output voltage to power a load according to embodiments herein.

In a manner as previously discussed, the soft start signal 195 can be used to ramp the output voltage 191 from a starting voltage such as 0 volts (or other pre-biased value) to approximately 1.0 volts (the regulation setpoint of output voltage 191 in this example). Because the comparator 260 is configured to use the lower magnitude signal of the offset ramp voltage signal 125 and the soft start reference signal 195, at approximately T12 and thereafter, the comparator 260 uses the offset ramp voltage signal 125 (instead of the soft start reference signal 195) as a threshold value to produce the control output 165.

As previously discussed, the monitor circuitry 145 monitors the magnitude of the output voltage 191. In response to detecting an operating condition such as that the magnitude of the output voltage is within an acceptable range of regulation for a threshold amount of time (such as for at least 0.4 milliseconds) between time T13 and time T15, the mode controller 140 controls the floor voltage generator circuit 110 to switch from the fixed voltage floor mode (mode #1) to the variable voltage floor mode (mode #2).

As further shown at or around time T15, there is a slight (insignificant) perturbation in the magnitude of the output voltage 191 that occurs due to the mode switchover.

Accordingly, as previously discussed, embodiments herein include monitoring the magnitude of the output voltage 191 and switching over to the variable voltage floor mode (mode #2) after detecting that the magnitude of the output voltage 191 is within a desired voltage range (such as between 0.9 and 1.1 volts DC) for a predetermined or threshold amount of time such as 0.4 milliseconds (between time T13 and T15). Note that the threshold amount of time can vary depending on the embodiment.

Figure 10:
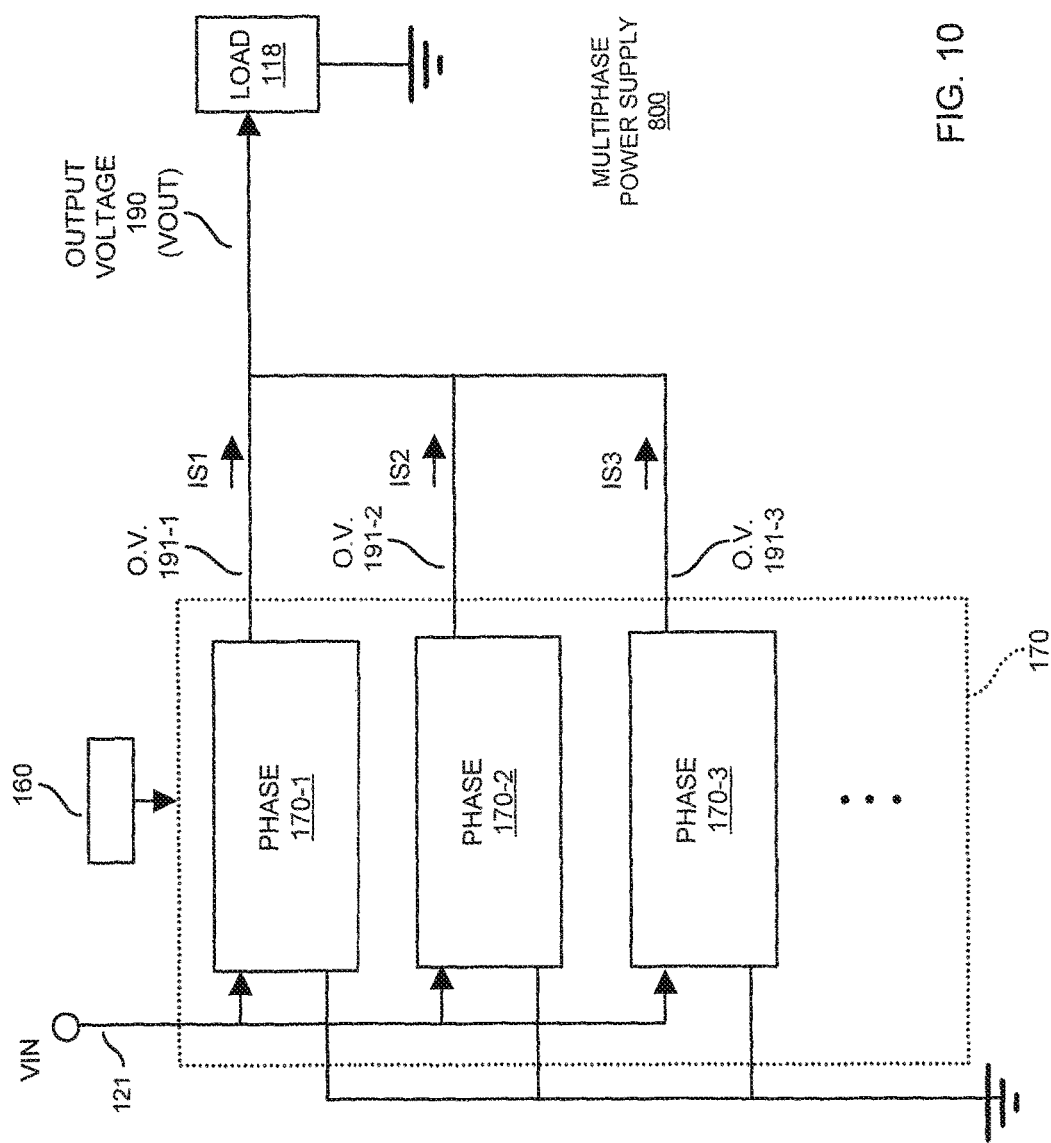
FIG. 10 is an example diagram illustrating use of control circuitry to control multiple phases according to embodiments herein.

FIG. 10 is an example diagram illustrating use of control circuitry to control multiple phases according to embodiments herein.

As shown, phase circuitry 170 of the multiphase power supply 800 can be configured to include phase 170-1, phase 170-2, phase 170-3, etc. Each of the phases contributes to supplying current to the load 118.

In a similar manner as previously discussed, the controller circuitry 140 (in FIG. 1) or duplicate of controller circuitry 140 for each phase can be configured to operate each of the phases 170-1, 170-2, etc., in a constant ON-time operational mode. In such an instance, each of the phases 170-1, 170-2, 173, etc., is configured in a similar manner as the single phase as shown in FIG. 2 to contribute to generation of the output voltage 191.

In other words, in case the power supply includes a plurality of phases, the functionalities disclosed herein, in particular that of the floor voltage ramp generator 110, optional ramp generator 120, mode controller 140, phase control circuitry 160 and phase circuitry disclosed in reference to FIGS. 1 and 2 are preferably implemented for each phase. These circuitries may be mutualized between the phases, or a given circuitry may be associated only to a single phase.

Figure 11:
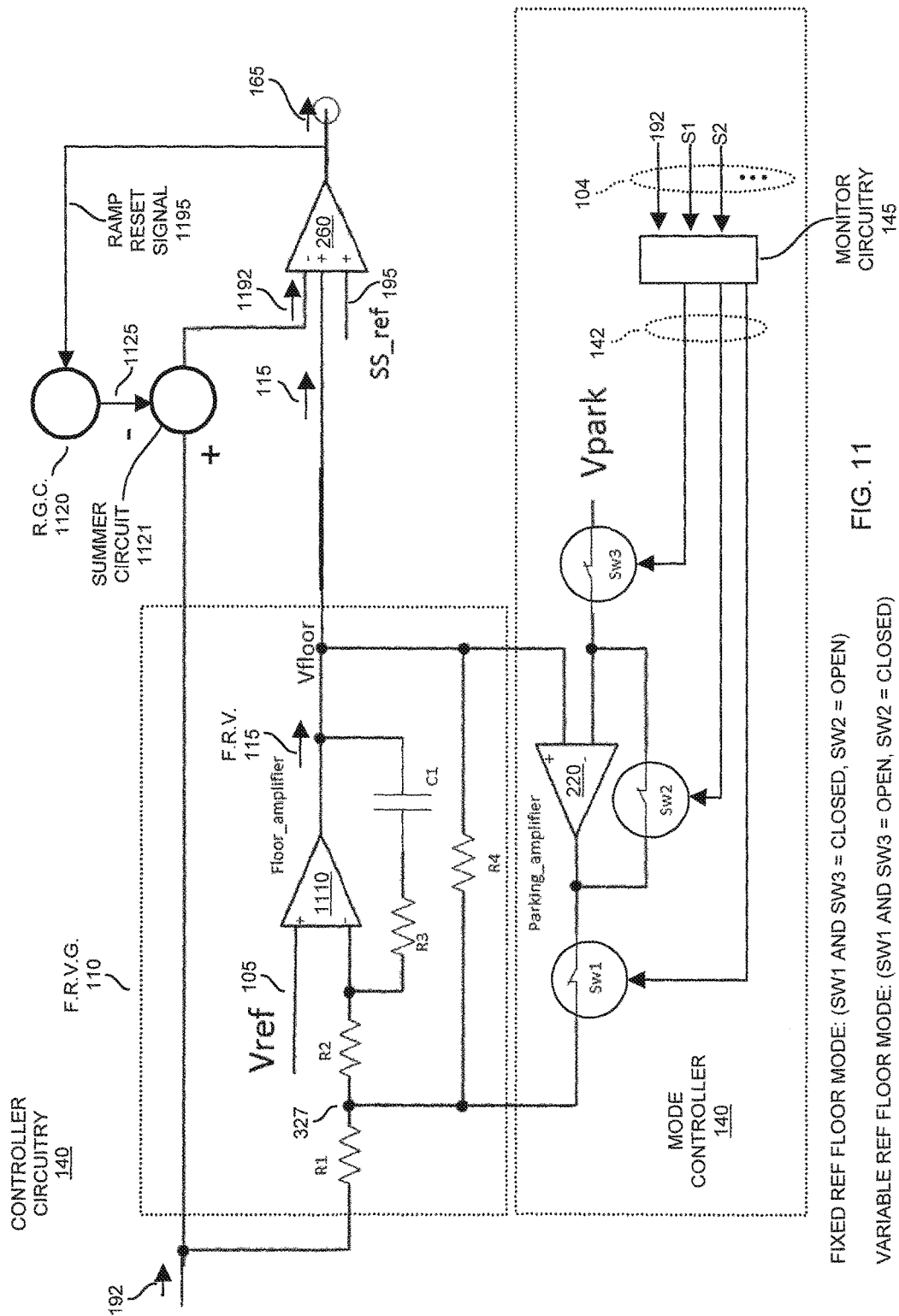
FIG. 11 is an example diagram illustrating a power supply including a floor reference voltage generator, power converter controller, and corresponding mode controller according to embodiments herein.

FIG. 11 is an example diagram illustrating the details of the floor reference voltage generator 110, of the mode controller 140, and of the phase control circuitry according to embodiments herein. Note that this embodiment includes a ramp generator 1120 that produces a ramp voltage signal 1125 that is offset with respect to the output voltage feedback signal 192 via the summer circuit 1121.

In the non-limiting example embodiment of FIG. 11, the floor reference voltage generator 110 includes amplifier 1110 and a configuration of resistors R1, R2, R3, R4, as well as capacitor C1 in a feedback path between the output of amplifier 1110 and the non-inverting input of the amplifier 1110. In a similar manner as previously discussed, the floor reference voltage generator 110 produces floor reference voltage 115 having a magnitude which depends on a mode selected by mode controller 140.

Further, as previously discussed, the mode controller 140 includes amplifier 220, switches SW1, SW2, and SW3, as well as monitor circuitry 145. The mode controller 140 controls an operational mode setting of the floor reference voltage generator 110 based on settings of switches SW1, SW2, and SW3. The monitor circuit 145 monitors one or more power supply conditions to determine in which state (fixed or variable mode) to operate the floor reference voltage generator 110.

During operation, a reference voltage Vpark (such as a fixed DC voltage value) is selectively coupled to the inverting input of the amplifier 220 via switch SW3. As further shown, the non-inverting input of the amplifier 220 is connected to receive the floor reference voltage 115.

In one embodiment, to operate the floor reference voltage generator 110 in the fixed voltage floor mode, the mode controller 140 sets each of the switches SW1 and SW3 to an ON state (closed, providing very low resistive path) and switch SW2 to an OFF state (open, providing a high resistive path). In such an instance, the control output (such as a floor voltage override signal) outputted from the amplifier 220 through switch SW1 to node 327 overrides the output voltage feedback signal 192 such that the floor reference voltage generator 110 produces the floor reference voltage 115 to be a fixed DC voltage value, Vpark. For instance, Vpark has a value of 550 mV DC (milliVolts).

In accordance with further embodiments, to operate the floor reference voltage generator 110 in the variable voltage floor mode, the mode controller 140 sets each of the switches SW1 and SW3 to an OFF state (opened, providing very high resistive path) and switch SW2 to an ON state (closed, providing a low resistive path). In such an instance, the amplifier 220 no longer drives a feedback path (specifically node 327) of the floor reference voltage generator 110. Instead, the amplifier 220 is set to operate in a unity gain mode in which the output of the amplifier 220 follows (tracks) the floor reference voltage 115 inputted to the non-inverting input of amplifier 220. As previously discussed, in the unity gain mode, closed switch SW2 connects the output of the amplifier 220 to the inverting input of the amplifier 220. Open switch SW1 ensures that the output of the amplifier 220 does not drive node 327 between resistor R1 and resistor R2. Thus, in the variable floor mode, the amplifier 220 can be configured as a tracking circuit operable to track the floor reference voltage 115.

Additionally, in the variable floor voltage mode, the output of the amplifier 220 is disconnected from driving the feedback path (such as node 327 or resistor R4) of floor reference voltage generator 110. In such an instance, the amplifier 210 produces the floor reference voltage 115 based upon a magnitude of reference voltage 105 and variations in the magnitude of the output voltage feedback signal 192.

Note further that when the mode controller 140 switches back to operating the floor voltage generator circuit 110 from the variable voltage floor mode to the fixed voltage floor mode, the amplifier 220 produces the mode control output 142 to at least initially drive the node 327 between resistor R1 and resistor R2 with the previously tracked voltage value of the amplifier 220 in the unity gain mode. As previously discussed, in the static voltage floor mode, the amplifier 220 causes the floor reference voltage generator 110 to drive the floor reference voltage 115 to voltage, Vpark (such as 550 mVDC).

During operation, ramp generator 1120 produces a ramp voltage signal 1125. The ramp generator 1120 outputs the ramp voltage signal 1125 to the summer circuit 1121. The summer circuit 1121 subtracts a magnitude of the ramp voltage signal 1125 from the output voltage feedback signal 192 to produce offset feedback signal 1192. As its name suggests, the ramp reset signal 1195 resets the ramp signal 1125 when the comparator detects that the magnitude of the offset an output voltage feedback signal 1192 is substantially equal to the floor reference voltage 115.

Figure 12:
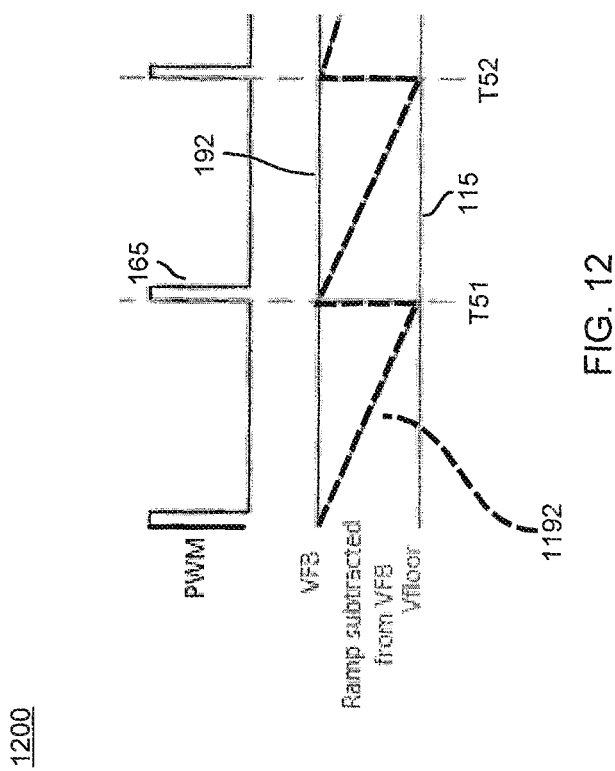
FIG. 12 is an example diagram illustrating a timing diagram of monitoring and controlling a power supply according to embodiments herein.

In accordance with further embodiments, regardless of the selected floor voltage generator mode, comparator 360 compares the received offset feedback signal 1192 to the smaller magnitude of the offset ramp voltage signal 125, and optionally to the soft start reference 195 as well—e.g. during start-up of the device —, to produce output control 165 as indicated in FIG. 12.

FIG. 12 is an example diagram illustrating a timing diagram according to embodiments herein.

As previously discussed in FIG. 11, the floor reference voltage 115 may be a static or varying voltage depending on the mode selected by mode controller 140.

During operation of the power supply in FIG. 11, as shown at time T51 of timing diagram 1200, the comparator 260 detects that the magnitude of the offset feedback signal 1192 is substantially equal to the magnitude of the floor reference voltage 115. In response to detecting such a condition, the comparator 360 produces output control 165 to activate high side switch circuitry 150-1 in the power supply 100. Thus, in response to the comparator 260 detecting a condition in which a difference between a magnitude of the output voltage feedback signal 192 and a magnitude of the floor reference voltage 115 is substantially equal to a magnitude of the ramp voltage signal 1125, the switching of the high side switch circuitry 150-1 for a predetermined ON-time as indicated by the output control 165 causes the magnitude of the output voltage to increase again.

Eventually, after completion of the pulse, consumption of current by the load 118 causes the magnitude of the offset feedback signal 1192 to decrease again. At or around time T52, the comparator 360 detects that the magnitude of the output voltage feedback signal 192 is substantially equal to the magnitude of the floor reference voltage 115 again. In response to the comparator 260 detecting this condition (such as that a difference between a magnitude of the output voltage feedback signal 192 and a magnitude of the floor reference voltage 115 is substantially equal to a magnitude of the ramp voltage signal 1125), the switching of the high side switch circuitry 150-1 as indicated by output control 165 for a predetermined ON-time causes the magnitude of the output voltage to increase again. The switching of the high side switch circuitry 150-1 for predetermined ON-time causes the magnitude of the output voltage to increase again.

The cycles above are repeated to maintain the magnitude of the output voltage 191 in a desired range.

Figure 13:
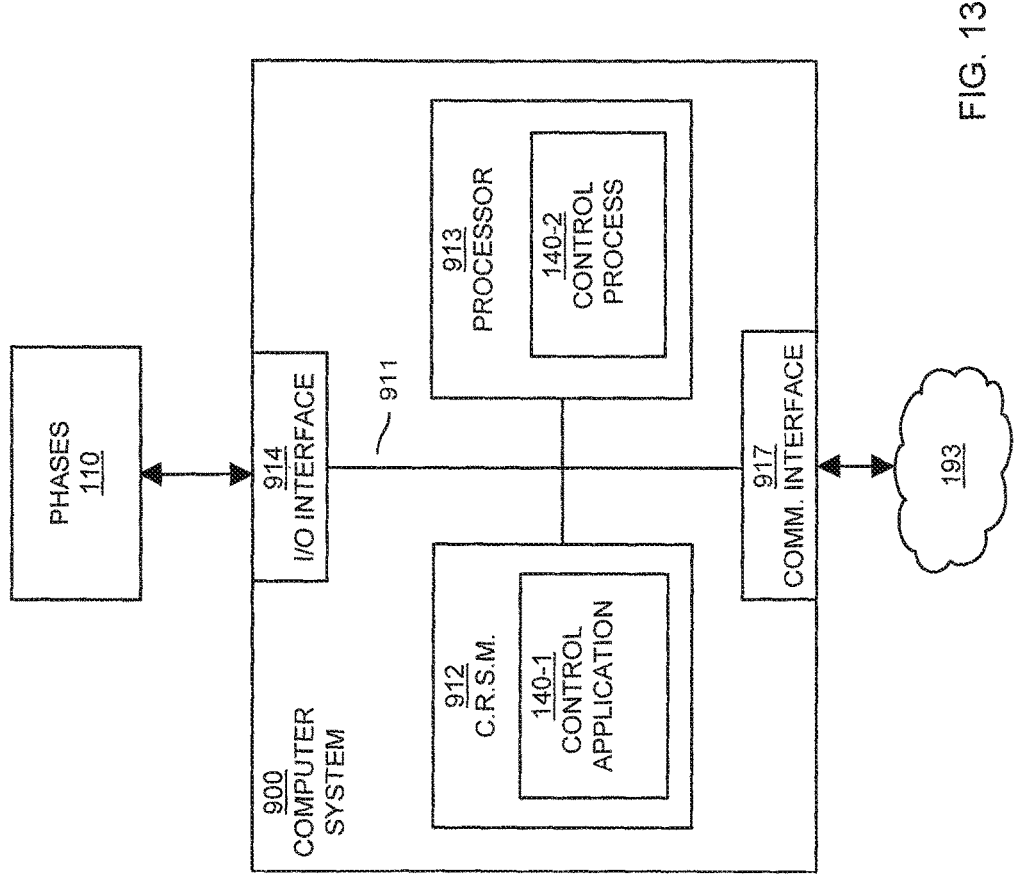
FIG. 13 is an example diagram illustrating computer processor hardware and related software instructions or logic circuit to execute methods according to embodiments herein.

FIG. 13 is an example block diagram of a computer device for implementing any of the operations as discussed herein according to embodiments herein.

As shown, computer system 900 (such as implemented by any resource such as controller circuitry 140, phase control circuitry 160, logic, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914, and a communications interface 919.

I/O interface 914 provides connectivity to any suitable circuitry such as each of phases 110.

Computer readable storage medium 912 can be any hardware storage resource or device such as memory, optical storage, hard drive, floppy disk, etc. In one embodiment, the computer readable storage medium 912 stores instructions and/or data used by the control application 140-1 to perform any of the operations as described herein.

Further in this example embodiment, communications interface 918 enables the computer system 900 and processor 913 to communicate over a resource such as network 193 to retrieve information from remote sources and communicate with other computers.

As shown, computer readable storage media 912 is encoded with control application 140-1 (e.g., software, firmware, etc.) executed by processor 913. Control application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in control application 140-1 stored on computer readable storage medium 912.

Execution of the control application 140-1 produces processing functionality such as control process 140-2 in processor 913. In other words, the control process 140-2 associated with processor 913 represents one or more aspects of executing control application 140-1 within or upon the processor 913 in the computer system 900.

In accordance with different embodiments, note that computer system 900 can be a micro-controller device, logic, hardware processor, hybrid analog/dif circuitry, etc., configured to control a power supply and perform any of the operations as described herein.

Functionality supported by the different resources will now be discussed via flowcharts in FIG. 14. Note that the steps in the flowcharts below can be executed in any suitable order.

Figure 14:
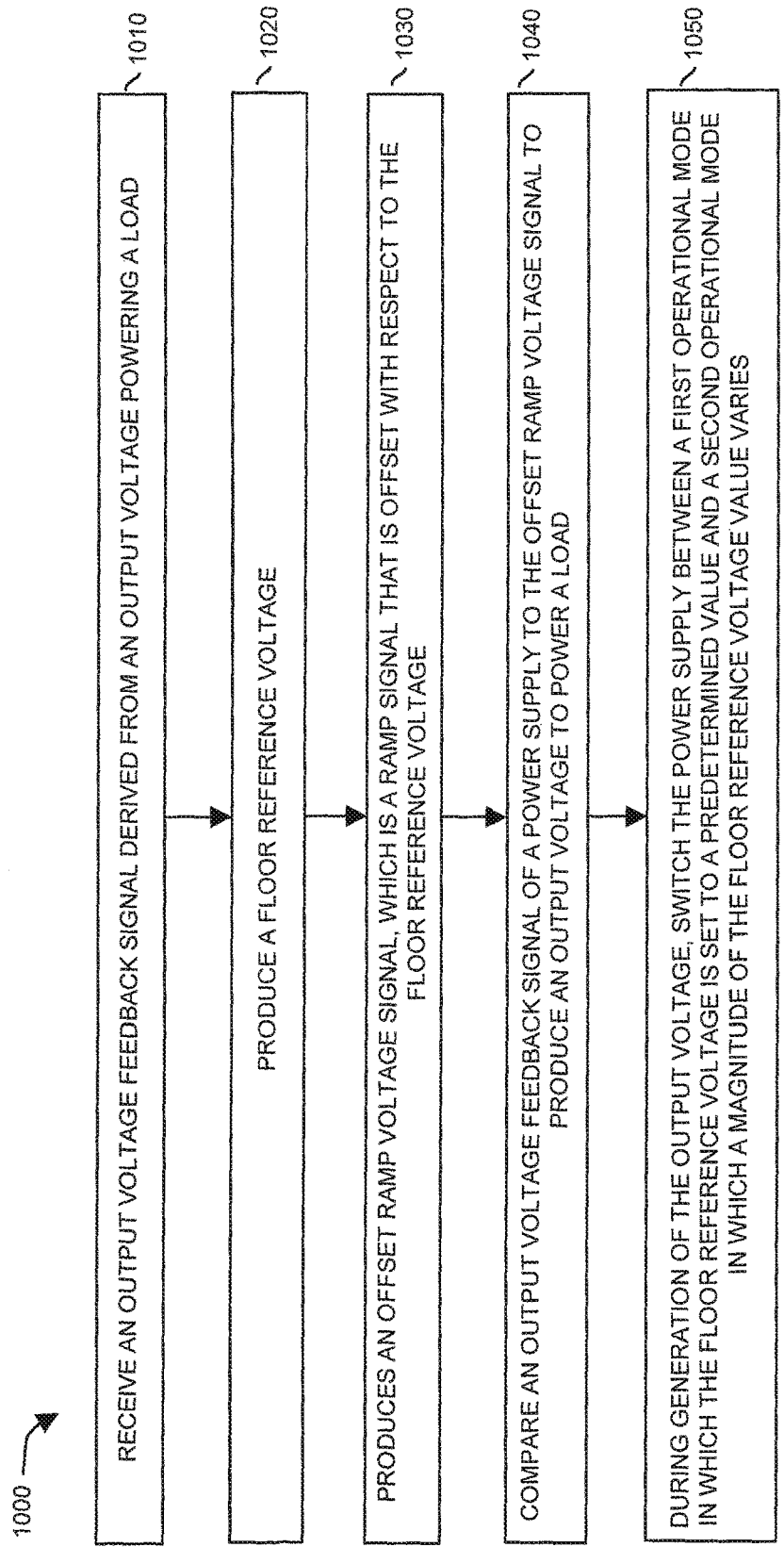
FIG. 14 is an example diagram illustrating a method according to embodiments herein.

FIG. 14 is a flowchart 1000 illustrating an example method according to embodiments herein. Note that there will be some overlap with respect to concepts as discussed above.

In processing operation 1010, the power supply 100 receives an output voltage feedback signal 192 derived from the generated output voltage 191.

In processing operation 1020, the floor voltage generator circuit 110 produces the floor reference voltage 115.

In processing operation 1030, the ramp generator 120 produces offset ramp voltage signal 125, which is a ramp signal that is offset with respect to the floor reference voltage 115. In processing operation 1040, the phase control circuitry 160 compares the output voltage feedback signal 192 and the offset ramp voltage signal 125 to produce output control 165 such as one or more phase control signals to produce the output voltage 191 used to power the load 118.

In processing operation 1050, depending on operating conditions of the power supply 100, the mode controller 140 switches the floor voltage generator circuit 110 between operating in a first operational mode and a second operational mode. In the first operational mode, the mode controller 140 sets the floor reference voltage 115 to a predetermined value (such as a fixed voltage value). In the second operational mode, the mode controller 140 varies a magnitude of the floor reference voltage 115 based on the magnitude of the output voltage feedback signal 192.

Note again that techniques herein are well suited for use in power converter circuit applications such as those that include multiple phases, multiple DC-DC power converter circuits, semi-resonant DC-DC phases, buck converters, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A power supply comprising:
a reference voltage generator operable to produce a floor reference voltage;
phase control circuitry operable to produce an output voltage to power a load;
a mode controller operable to switch the reference voltage generator between a first operational mode in which the floor reference voltage is set to a predetermined fixed voltage value and a second operational mode in which a magnitude of the floor reference voltage varies depending on a magnitude of the output voltage; and
the phase control circuitry further operable to, during both the first operational mode and the second operational mode, produce the output voltage to power the load as a function of an output voltage feedback signal derived from the output voltage and of the floor reference voltage;
the power supply further comprising: a ramp generator operable to generate a ramp voltage signal, the ramp voltage signal being offset with respect to the floor reference voltage to produce an offset ramp voltage signal; and a comparator operable to compare the output voltage feedback signal to the offset ramp voltage signal to control the magnitude of the output voltage.

2. The power supply as in claim 1,
wherein the ramp voltage signal is cyclical, each cycle of the ramp voltage signal having a monotonous portion during which the ramp voltage signal increases or decreases, and a clamped portion in which a magnitude of the ramp voltage signal is substantially constant.

3. The power supply as in claim 1 further comprising:
a tracking circuit operable to track the floor reference voltage during the second operational mode during which the floor reference voltage varies, the tracked floor reference voltage inputted to the reference voltage generator in response to detecting switchover from the second operational mode to the first operational mode.

4. A power supply comprising:
a reference voltage generator operable to produce a floor reference voltage;
phase control circuitry operable to produce an output voltage to power a load as a function of an output voltage feedback signal derived from the output voltage and of the floor reference voltage;
a mode controller operable to switch the reference voltage generator between a first operational mode in which the floor reference voltage is set to a predetermined fixed voltage value and a second operational mode in which a magnitude of the floor reference voltage varies; and
wherein the phase control circuitry includes a comparator operable to, while in the first operational mode, switch between comparison of: i) the output voltage feedback signal and a soft start signal, and ii) the output voltage feedback signal and the floor reference voltage.

5. The power supply as in claim 4, wherein the comparator uses the soft start signal for comparison to the output voltage feedback signal depending on a magnitude of the soft start signal.

6. The power supply as in claim 1, wherein the power supply is a DC-DC switching power supply operated in a constant ON time control mode in which the phase control circuitry activates respective control switch circuitry at a varying frequency rate to produce the output voltage.

7. The power supply as in claim 1, wherein the mode controller includes a monitor circuit operable to monitor one or more operating condition of the power supply during generation of the output voltage and switch between the first operational mode and the second operational mode based on said one or more operating condition of the power supply;

wherein said one or more operating condition is selected from the group consisting of:
i) a magnitude of the output voltage, and
ii) current supplied to the load via the output voltage.

8. The power supply as in claim 1, wherein the reference voltage generator is operable to adjust a magnitude of the floor reference voltage in response to transient conditions in which the load powered by the output voltage varies a rate of consuming current provided by the output voltage.

9. The power supply as in claim 5, wherein the mode controller is operable to drive a node in a feedback path of an amplifier circuit to set the floor reference voltage to the predetermined fixed voltage value during the first operational mode.

10. The power supply as in claim 5 further comprising:
a switch operable to selectively convey a floor voltage control signal into a feedback path of an amplifier circuit while in the first operational mode to set the floor reference voltage to the predetermined fixed voltage value.

11. The power supply as in claim 1, wherein the phase control circuitry is operable to generate fixed pulse width switch control signals to produce the output voltage.

12. A method comprising:
producing a floor reference voltage;
producing an output voltage of a power supply to power a load;
during generation of the output voltage, switching the power supply between a first operational mode in which the floor reference voltage is set to a predetermined fixed voltage value and a second operational mode in which a magnitude of the floor reference voltage varies depending on a magnitude of the output voltage, the method further comprising:
during both the first operational mode and the second operational mode, producing the output voltage to power the load as a function of an output voltage feedback signal derived from the output voltage and of the floor reference voltage, the method further comprising:
generating a ramp voltage signal;
offsetting the ramp voltage signal with respect to the floor reference voltage to produce an offset ramp voltage signal; and
comparing the output voltage feedback signal to the offset ramp voltage signal to control the magnitude of the output voltage.

13. The method as in claim 12 further comprising:
monitoring one or more attribute of generating the output voltage; and
switching between the first operational mode and the second operational mode based on the one or more monitored attribute of generating the output voltage.

14. The method as in claim 12 further comprising:
deriving the floor reference voltage based on a comparison of the output voltage feedback signal to a reference signal while in the second operational mode in which the floor reference voltage varies.

15. Computer-readable storage hardware having instructions stored thereon, the instructions, when carried out by computer processor hardware, cause the computer processor hardware to:
produce a floor reference voltage;
generate a ramp voltage signal;
offset the ramp voltage signal with respect to the floor reference voltage to produce an offset ramp voltage signal;
produce an output voltage of a power supply to power a load;
compare the output voltage feedback signal to the offset ramp voltage signal to control the magnitude of the output voltage;
during generation of the output voltage, switch operation of the power supply between a first operational mode in which the floor reference voltage is set to a predetermined fixed value and a second operational mode in which a magnitude of the floor reference voltage varies depending on a magnitude of the output voltage; and
during both the first operational mode and the second operational mode, produce the output voltage to power the load as a function of an output voltage feedback signal derived from the output voltage and of the floor reference voltage.

16. The power supply as in claim 1, wherein the mode controller is operable to switch the reference voltage generator from the first operational mode to the second operational mode depending on the magnitude of the output voltage feedback signal.

17. The power supply as in claim 1, wherein the mode controller is operable to switch the reference voltage generator from the first operational mode to the second operational mode in response to detecting that the magnitude of the output voltage is within a desired voltage range for a predetermined amount of time.

18. The power supply as in claim 1, wherein the reference voltage generator varies the magnitude of the floor reference voltage depending on the magnitude of the output voltage feedback signal, the second operational mode decreasing the magnitude of the floor reference voltage in response to an increase in the magnitude of the output voltage.

19. The power supply as in claim 1, wherein the reference voltage generator is operable to generate a variable reference voltage; and
wherein the phase control circuitry is operable to compare a sum of the floor reference voltage and the variable reference voltage to the output voltage feedback signal.

20. The power supply as in claim 19, wherein the phase control circuitry deactivates a high side switch delivering power to the load in response to detecting that the sum is equal to the magnitude of the output voltage feedback signal, deactivation of the high side switch maintaining the magnitude of the output voltage within a desired voltage range.

21. The power supply as in claim 1, wherein the floor reference voltage is set to an intermediate voltage value between the magnitude of the output voltage and a ground reference voltage of the power supply.

22. The power supply as in claim 1, wherein the mode controller is operable to switch from operating in the second operational mode to the first operational mode in response to detecting that an amount of current consumed by the load is below a threshold value.

23. The power supply as in claim 1, wherein the phase control circuitry includes an inductor, the phase control circuitry controlling current to flow in a forward direction from a power source through the inductor to the load, the current in the forward direction producing the output voltage powering the load; and
wherein the mode controller is operable to switch from operating in the second operational mode to operating in the first operational mode in response to detecting a condition in which current flows through the inductor in a reverse direction, the reverse direction being opposite the forward direction.

24. The power supply as in claim 1, wherein the reference voltage generator includes an amplifier circuit; and
wherein the mode controller is operable to drive a node in a feedback path of the amplifier circuit to set the floor reference voltage to the predetermined fixed voltage value during the first operational mode.

25. The power supply as in claim 1, wherein the reference voltage generator includes an amplifier circuit, the power supply further comprising:
a switch operable to selectively convey a floor voltage control signal into a feedback path of the amplifier circuit while in the first operational mode to set the floor reference voltage to the predetermined fixed voltage value.

26. The power supply as in claim 1, wherein a reference setpoint used to regulate the magnitude of the output voltage is set to a same reference value during both the first mode and the second mode.

\* \* \* \* \*